United States Patent
Blank et al.

(10) Patent No.: US 10,736,266 B2
(45) Date of Patent: Aug. 11, 2020

(54) CONTROL OF SETTINGS ON A COMBINE HARVESTER WITH BIAS REMOVAL

(71) Applicant: Deere & Company, Moline, IL (US)

(72) Inventors: Sebastian Blank, Moline, IL (US); Dohn W. Pfeiffer, Bettendorf, IA (US)

(73) Assignee: Deere & Company, Moline, IL (US)

( * ) Notice: Subject to any disclaimer, the term of this patent is extended or adjusted under 35 U.S.C. 154(b) by 121 days.

(21) Appl. No.: 15/994,044

(22) Filed: May 31, 2018

(65) Prior Publication Data

US 2019/0364732 A1 Dec. 5, 2019

(51) Int. Cl.
*A01D 41/127* (2006.01)
*G06Q 50/02* (2012.01)

(52) U.S. Cl.
CPC ........... *A01D 41/127* (2013.01); *G06Q 50/02* (2013.01)

(58) Field of Classification Search
None
See application file for complete search history.

(56) References Cited

U.S. PATENT DOCUMENTS

| 2012/0253744 | A1 | 10/2012 | Schmidt |
| 2016/0066505 | A1 | 3/2016 | Bakke et al. |
| 2016/0078391 | A1 | 3/2016 | Blank et al. |
| 2016/0330906 | A1 | 11/2016 | Acheson et al. |
| 2017/0083026 | A1 | 3/2017 | Schmidt et al. |
| 2017/0109395 | A1 | 4/2017 | Farah |
| 2017/0251600 | A1 | 9/2017 | Anderson et al. |

FOREIGN PATENT DOCUMENTS

| EP | 3316208 A1 | 5/2018 |
| WO | 2015153809 A1 | 10/2015 |
| WO | WO 2016074058 A1 | 5/2016 |

OTHER PUBLICATIONS

European Search Report issued in counterpart European Patent Application No. 19176770.6 dated Oct. 29, 2019 (7 pages).

*Primary Examiner* — Abdhesh K Jha
(74) *Attorney, Agent, or Firm* — Christopher J. Volkmann; Kelly, Holt & Christenson, PLLC

(57) ABSTRACT

A method performed by a harvesting machine control system comprises obtaining bias data indicative of a performance bias of a first harvesting machine relative to at least one other harvesting machine, receiving a settings input indicative of a request to set performance of the first harvesting machine to correspond to performance of the at least one other harvesting machine, based on the bias data and machine settings associated with the performance of the at least one other harvesting machine, determining adjusted machine settings for the first harvesting machine, and outputting a control instruction to the first harvesting machine based on the adjusted machine settings.

14 Claims, 29 Drawing Sheets

CONTROL OF SETTINGS ON A COMBINE HARVESTER WITH BIAS REMOVAL

FIELD OF THE DESCRIPTION

The present description generally relates to a control system for a mobile or other work machine. More specifically, but not by limitation, the present description relates to a control system that compensates for bias in controlling settings on a combine harvester.

BACKGROUND

There are a wide variety of different types of equipment, such as construction equipment, turf care equipment, forestry equipment and agricultural equipment. These types of equipment are often operated by an operator. For instance, a combine harvester (or combine) is operated by an operator, and it has many different mechanisms that are controlled by the operator in performing a harvesting operation. The combine may have multiple different mechanical, electrical, hydraulic, pneumatic, electromechanical (and other) subsystems, some or all of which can be controlled, at least to some extent, by the operator. The systems may need the operator to make a manual adjustment outside the operator's compartment or to set a wide variety of different settings and provide various control inputs in order to control the combine. Some inputs not only include controlling the combine direction and speed, but also threshing clearance and sieve settings, rotor and fan speed settings, and a wide variety of other settings and control inputs.

The discussion above is merely provided for general background information and is not intended to be used as an aid in determining the scope of the claimed subject matter.

SUMMARY

An example method performed by a harvesting machine control system comprises obtaining bias data indicative of a performance bias of a first harvesting machine relative to at least one other harvesting machine, receiving a settings input indicative of a request to set performance of the first harvesting machine to correspond to performance of the at least one other harvesting machine, based on the bias data and machine settings associated with the performance of the at least one other harvesting machine, determining adjusted machine settings for the first harvesting machine, and outputting a control instruction to the first harvesting machine based on the adjusted machine settings.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
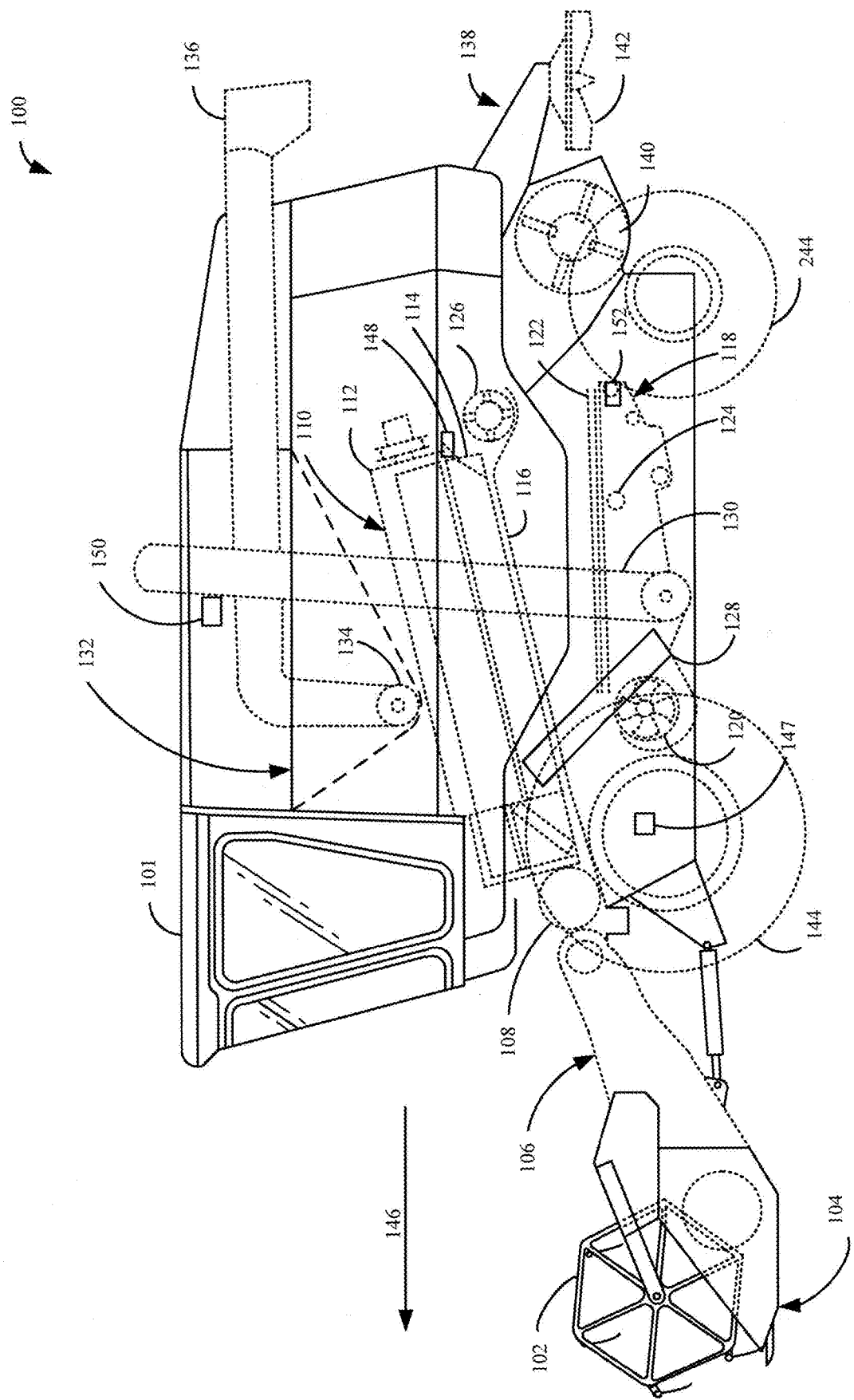
FIG. 1 is a partial pictorial, partial schematic illustration of a combine harvester.

Work machines often have a wide variety of sensors that sense a variety of different variables, such as operating parameters. Examples of work machines include, but are not limited to, agricultural equipment, construction equipment, turf and forestry equipment, among others. Many of these work machines have mechanisms that are controlled by the operator in performing operations.

It is noted that while examples are described herein in the context of an agricultural combine or harvesting machine, the example systems and related components and methods can be utilized in other types of agricultural machines (e.g., seeder, sprayer, tractor, etc.), as well as in other types of applications, such as, but not limited to, turf management, forestry, construction, to name a few.

For sake of discussion, but not by limitation, an agricultural combine harvester (or combine) often has a wide variety of sensors that sense a variety of different variables, such as operating parameters, along with crop characteristics, environmental parameters, etc. The sensors can communicate this information over a controller area network (CAN) bus (or another network, such as an Ethernet network, wireless network, etc.) to various systems that can process the sensor signals and generate output signals (such as control signals) based on the sensed variables. Further, the combine can have wireless and/or wired connections to remote sensors, such as drones, satellites, environmental sensing networks such as soil moisture probes, weather data, etc.

The combine is operated by an operator, and has many different mechanisms that are controlled by the operator in performing a harvesting operation. The combine may have multiple different mechanical, electrical, hydraulic, pneumatic, electromechanical (and other) subsystems, some or all of which can be controlled, at least to some extent, by the operator. The systems may need the operator to make a manual adjustment outside the operator's compartment or to set a wide variety of different settings and provide various control inputs in order to control the combine. Some inputs not only include controlling the combine direction and speed, but also threshing clearance and sieve settings, rotor and fan speed settings, and a wide variety of other settings and control inputs.

In some instances, a particular organization has a plurality of different combine harvesters that are all operating at the same time. These combine harvesters are often referred to as a "fleet" of harvesters. The operation of the fleet of harvesters is often overseen by a (remote or local) fleet manager (or farm manager) who is located remotely relative to at least some of the combine harvesters in the fleet. It can be extremely difficult for a farm manager, remote manager, or other user to determine how the various combine harvesters are operating in the fleet, how they are operating relative to one another, how they are operating relative to other similarly situated harvesters, etc.

It is also extremely difficult for a remote manager or other user to identify performance criteria for the various operators and machines, and determine how they compare relative to one another, in near real time. Thus, it is very difficult for a user to attempt to modify the settings on any combine harvester to increase the performance of that harvester. Even if the user has access to the current settings of a particular machine, and has access to an interface that allows the user to view and interact with display elements to adjust the machine settings of the combine, it can be difficult for the user to know what value to set the settings to on a particular machine. Also, even if the settings on two machines are set to the same value, the combines may not perform the same. This can result because of different harvesting characteristics (crop type, terrain, etc.) However, even if the harvesting characteristics are the same (or similar) for two different machines, those two different machines may perform differently even if they have their settings set to the same values.

Assume, for instance, that a user is able to remotely set the machine settings (i.e., concave clearance, rotor speed, clearing fan speed, sieve and chaffer settings) on two separate combines to the same value. Assume further that the two combines are operating over similar operating characteristics (terrain, crop type, crop moisture, etc.), the two combines may still perform differently from one another. This can be due to various performance biases. The biases may be caused by such things as manufacturing (build and assembly) tolerances, sensing bias (tolerance in monitoring sensors, sensor condition and wear, tolerances in the sensing circuity itself, etc.), difference in calibration, machine wear over time, among other things.

Such bias can result in decreased machine performance, which may result in unrealized performance opportunity (e.g., crop loss, increased fuel consumption, increased time required to complete harvesting operation, etc.). For instance, a user may set the same (or similar) settings on two combine machines that are of the same, or substantially similar, make (manufacturer) and model. Therefore, the user expects that both machines are or will experience the same performance, when, in fact, one of the machines may be experiencing relatively poor performance due to performance bias. Further, even if the user is aware of the performance difference, the user may not be aware of how to adjust the settings on a particular one of the machines (e.g., which setting(s) and what setting value(s)), so that the particular machine experiences similar performance as the other machine(s) in the fleet.

The present description relates to a machine control system having a setting bias compensation component that compensates for bias in controlling settings on an agricultural machine (e.g., combine harvester), or other work machine. The control system is configured to determine bias between two or more machines, and to determine machine setting adjustments that remove or otherwise compensate for the bias. Further, it is noted that while systems and devices are described as being remote from the combine (e.g., providing remote control of combine settings), some or all of the systems and devices can be local, or some can be local and some can be remote.

Before describing the setting bias compensation system in further detail, an overview of an agricultural machine will be described.

FIG. 1 is a partial pictorial, partial schematic, illustration of an agricultural machine 100, in an example where machine 100 is a combine harvester (or combine). It can be seen in FIG. 1 that combine 100 illustratively includes an operator compartment 101, which can have a variety of different operator interface mechanisms, for controlling combine 100, as will be discussed in more detail below. Combine 100 can include a set of front end equipment that can include header 102, and a cutter generally indicated at 104. It can also include a feeder house 106, a feed accelerator 108, and a thresher generally indicated at 110. Thresher 110 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house 106 and feed accelerator 108) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem that includes an engine that drives ground engaging wheels 144 or tracks, etc. It will be noted that combine 100 may also have more than one of any of the subsystems mentioned above (such as left and right cleaning shoes, separators, etc.).

In operation, and by way of overview, combine 100 illustratively moves through a field in the direction indicated by arrow 146. As it moves, header 102 engages the crop to be harvested and gathers it toward cutter 104. After it is cut, it is moved through a conveyor in feeder house 106 toward feed accelerator 108, which accelerates the crop into thresher 110. The crop is threshed by rotor 112 rotating the crop against concave 114. The threshed crop is moved by a separator rotor in separator 116 where some of the residue is moved by discharge beater 126 toward the residue subsystem 138. It can be chopped by residue chopper 140 and spread on the field by spreader 142. In other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. That residue can also be moved rearwardly in combine 100 toward the residue handling subsystem 138.

Tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well.

FIG. 1 also shows that, in one example, combine 100 can include ground speed sensor 147, one or more separator loss sensors 148, a clean grain camera 150, and one or more cleaning shoe loss sensors 152. Ground speed sensor 146 illustratively senses the travel speed of combine 100 over the ground. This can be done by sensing the speed of rotation of the wheels, the drive shaft, the axel, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 152 illustratively provide an output signal indicative of the quantity of grain loss by both the right and left sides of the cleaning shoe 118. In one example, sensors 152 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

It will also be appreciated that sensor and measurement mechanisms (in addition to the sensors already described) can include other sensors on combine 100 as well. For instance, they can include a residue setting sensor that is configured to sense whether machine 100 is configured to chop the residue, drop a windrow, etc. They can include cleaning shoe fan speed sensors that can be configured proximate fan 120 to sense the speed of the fan. They can include a threshing clearance sensor that senses clearance between the rotor 112 and concaves 114. They include a threshing rotor speed sensor that senses a rotor speed of rotor 112. They can include a chaffer clearance sensor that senses the size of openings in chaffer 122. They can include a sieve clearance sensor that senses the size of openings in sieve 124. They can include a material other than grain (MOG) moisture sensor that can be configured to sense the moisture level of the material other than grain that is passing through combine 100. They can include machine setting sensors that are configured to sense the various configurable settings on combine 100. They can also include a machine orientation sensor that can be any of a wide variety of different types of sensors that sense the orientation of combine 100. Crop property sensors can sense a variety of different types of crop properties, such as crop type, crop moisture, and other crop properties. They can also be configured to sense characteristics of the crop as they are being processed by combine 100. For instance, they can sense grain feed rate, as it travels through clean grain elevator 130. They can sense mass flow rate of grain through elevator 130, or provide other output signals indicative of other sensed variables. Some additional examples of the types of sensors that can be used are described below.

Figure 2:
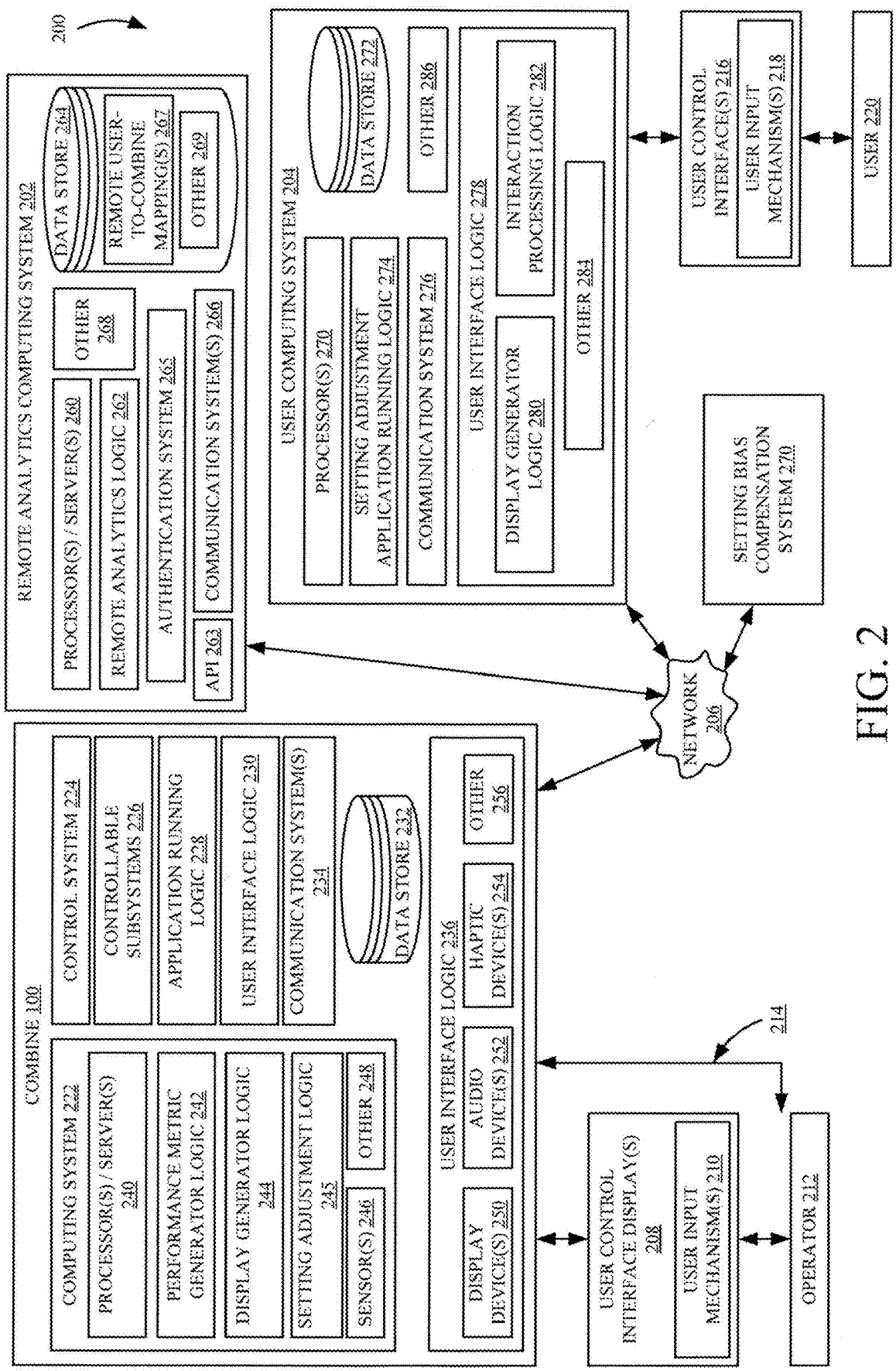
FIG. 2 is a block diagram of one example of a computing system architecture that includes the combine harvester illustrated in FIG. 1.

FIG. 2 is a block diagram showing one example of an architecture 200 that includes combine harvester 100 coupled for communication with remote analytics computing system 202 and user computing system 204, over network 206. Network 206 can be any of a wide variety of different types of networks, such as a wide area network, a local area network, a near field communication network, a cellular network, or any of a wide variety of other networks or combinations of networks. User computing system 204 can comprise a remote system or a local system, or it can be distributed between remote and local systems.

As is discussed in greater detail below, combine harvester 100 can communicate with other systems using store-and-forward mechanisms as well. FIG. 2 also shows that, in one example, combine harvester 100 can generate operator interface displays 208 with user input mechanisms 210 for interaction by operator 212. Operator 212 is illustratively a local operator of combine 100, in the operator's compartment of combine 100, and can interact with user input mechanisms 210 in order to control and manipulate combine harvester 100. In addition, as is described below, operator 212 can interact directly with other user interface mechanisms on combine harvester 100. This is indicated by arrow 214.

FIG. 2 also shows that, in one example, user computing system 204 illustratively generates user interfaces 216, with user input mechanisms 218, for interaction by user 220 (who may be a farm manager, a remote manager, or other remote user that has access to data corresponding to combine 100). User 220 illustratively interacts with user input mechanisms 218 in order to control and manipulate user computing system 204, and, in some examples, to control portions of combine harvester 100 and/or remote analytics computing system 202. In one example, user 220 is the operator of combine 100.

Before describing the overall operation of architecture 200 in more detail, a brief description of some of the items in architecture 200, and their operation, will first be provided. As shown in FIG. 2, in addition to the items described above with respect to FIG. 1, combine 100 can include computing system 222, one or more control systems 224, controllable subsystems 226, application running logic 228, user interface logic 230, data store 232, one or more communication systems 234, user interface mechanisms 236, and it can include a wide variety of other items 238. Computing system 222, itself, can include one or more processors or servers 240, performance metric generator logic 242, display generator logic 244, setting adjustment logic 245, a plurality of different sensors 246, and it can include a wide variety of other items 248. User interface mechanisms 236 can include one or more display devices 250, one or more audio devices 252, one or more haptic devices 254, and it can include other items 256, such as a steering wheel, joysticks, pedals, levers, buttons, keypads, etc.

As described above with respect to FIG. 1, sensors 246 can generate a wide variety of different sensor signals representing a wide variety of different sensed variables. Performance metric generator logic 242 (as is described in greater detail below with respect to FIG. 3) illustratively generates performance metrics indicative of the operational performance of combine 100. Display generator logic 244 illustratively generates a control interface display for operator 212. The display can be an interactive display with user input mechanisms 210 for interaction by operator 212.

Control system 224 can generate control signals for controlling a variety of different controllable subsystems 226 based on the sensor signals generated by sensors 246, based on the performance metrics generated by performance score generator logic 244, based upon user inputs received through user interface mechanisms 236, based upon information received from user computing system 204 or from remote analytics computing system 202, or it can generate control signals a wide variety of other ways as well. Controllable subsystems 226 can include a variety of different systems, such as a propulsion system used to drive combine 100, a threshing subsystem as described above with respect to FIG. 1, a cleaning subsystem (such as the cleaning fan, the chaffer, the sieve, etc.) and/or a variety of other controllable subsystems, some of which are discussed above with respect to FIG. 1.

Application running logic 228 can illustratively run any of a variety of different applications that may be stored in data store 232. The applications can be used to control combine 100, such as by interacting with control system 224 to control controllable subsystems 226, to aggregate information sensed and collected by combine 100, to communicate that information to other systems, etc. Communication systems 234 illustratively include one or more communication systems that allow combine 100 to communicate with remote analytics computing system 202 and user computing system 204. Thus, they include one or more communication systems, that can communicate over the networks described above.

Display generator logic 244 illustratively generates an operator display and uses user interface logic 230 to display the operator display on one of display devices 250. It will be noted that display devices 250 can include a display device that is integrated into the operator compartment of combine 100, or it can be a separate display on a separate device that may be carried by operator 212 (such as a laptop computer, a mobile device, etc.). All of these architectures are contemplated herein.

In the example shown in FIG. 2, remote analytics computing system 202 illustratively includes one or more processors or servers 260, remote analytics logic 262 which exposes an application programming interface (API) 263, data store 264, authentication system 265, one or more communication systems 266 and it can include a wide variety of other items 268. Remote analytics logic 262 illustratively receives performance metrics, generated by performance metric generator logic, from a plurality of different combines.

By way of example, each particular one of the plurality of different combines (including combine 100) includes respective performance metric generator logic (such as logic 242 in computing system 222), which generates respective performance metrics for the particular combine that is sent to remote analytics logic 262. Remote analytics logic 262 can illustratively aggregate that data and compare it to reference sets of data to generate multi-machine performance metrics that are based on the performance metrics from the plurality of different combines.

The data can be stored on data store 264, along with a wide variety of other information, such as, but not limited to, operator information corresponding to the operators of each of the combines, machine details identifying the particular combines being used, the current combine settings for each combine (e.g., that are updated by the combines and/or combine operators), the current conditions or characteristics in which the combines are operating (e.g., terrain, crop type, crop moisture, etc.), the current performance metrics for each combine, and/or historical data collected from the combines.

As is discussed in further retail below, the settings and performance metrics for each combine can be position-referenced with the current position of the combine when the settings were used and performance metrics obtained. As such, system 102 can obtain sets of geo-referenced combine settings (by combine) and geo-referenced performance scores (by combine). This geo-referenced information (e.g., settings and scores) can be utilized by a control system (i.e., setting bias compensation system 270) to estimate, and compensate for, bias between different combines.

It is noted that while setting bias compensation system 270 is illustrated as a separate system accessible over network 206, in other examples system 270, or parts thereof, can reside on one or more of combine 100, remote analytics computing system 202, and/or user computing system 204.

The data store 264 can include authentication information used to authenticate user 220 (such as a remote user), operator 212, and others. It can include mappings 267 that map between combines and the remote users they are assigned to. It can include a wide variety of other information 269 as well.

Remote analytics computing system 202 illustratively uses one or more of the communication systems 266 to communicate with both combine 100 (and other combines) and user computing system 204.

User computing system 204 can be a wide variety of different types of systems, such as a mobile device, a laptop computer, etc. It illustratively includes one or more processors 271, data store 272, application running logic 274, communication system 276, and user interface logic 278 (which, itself, includes display generator logic 280, interaction processing logic 282, and it can include other items 284). User computing system 204 can, also include a wide variety of other items 286.

Application running logic 274 illustratively runs an application that allows user 220 to access comparison information that compares the performance of various combines 100 and their operators on a near real time basis (such as within five seconds of real time or within another time value of real time). It also illustratively surfaces user control interfaces 216, with user input mechanisms 218 so that user 220 can provide settings inputs, or other control information, and communicate it to one or more combines 100. Again, as with communication systems 234 and 266, communication system 276 allows user computing system 204 to communicate with other systems over network 206. Display generator logic 282 illustratively generates a display, with various interactive display elements on control user interface 216. Interaction processing logic 282 illustratively detects user interaction with the display, from user 220, and performs control operations based upon those user interactions.

Figure 3:
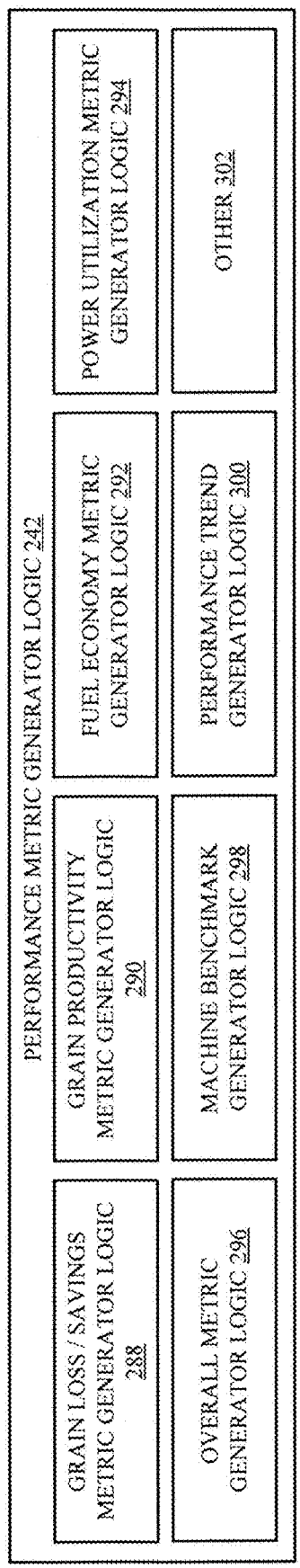
FIG. 3 is a block diagram showing one example of performance score generator logic in more detail.

FIG. 3 is a block diagram showing one example of performance metric generator logic 242, in more detail. In the example shown in FIG. 3, performance metric generator logic 242 illustratively includes grain loss/savings metric generator logic 288, grain productivity metric generator logic 290, fuel economy metric generator logic 292, power utilization metric generator logic 294, overall metric generator logic 296, machine benchmark generator logic 298, performance trend generator logic 300, and it can include a wide variety of other items 302. Some ways of generating performance metrics are shown in more detail in co-pending US Patent Publication numbers 2015/0199637 A1, 2015/0199360 A1, 2015/0199630 A1, 2015/0199775 A1, 2016/0078391 A1 which are incorporated herein by reference.

Grain loss/savings metric generator logic 288 illustratively generates a metric indicative of grain savings or grain loss that the combine 100 is experiencing. This can be generated by sensing and combining items such as the mass flow of crop through combine 100 sensed by a sensor 246, tailings volume of tailings output by combine 100 using a volume sensor, crop type, the measured loss on combine 100 using various loss sensors (such as separator loss sensors, cleaning shoe loss sensors, etc.), among others. The metric can be generated by performing an evaluation of the loss using fuzzy logic components and an evaluation of the tailings, also using fuzzy logic components. Based upon these and/or other considerations, grain loss/savings metric generator logic 288 illustratively generates a grain loss/savings metric indicative of the performance of combine 100, under the operation of operator 212, with respect to grain loss/savings.

Grain productivity metric generator logic 290 illustratively uses the sensor signals generated by sensors 246 on the combine to sense vehicle speed, mass flow of grain through combine 100, and the machine configuration of combine 100 and generates an indication of crop yield and processes the crop yield to evaluate it against a productivity metric. For instance, a productivity metric plotted against a yield slope provides an output indicative of grain productivity. This is only one example.

Fuel economy metric generator logic 292 illustratively generates a fuel economy metric, based upon the throughput versus fuel consumption rate sensed by sensors on the combine 100, a separator efficiency metric and also, based upon sensed fuel consumption that is sensed by a sensor 246, vehicle state, vehicle speed, etc. The fuel economy metric can be based on a combination of a harvest fuel efficiency and a non-productive fuel efficiency. These metrics may indicate, respectively, the efficiency of combine 100 during harvesting operations, and in other, non-harvesting operations (such as when idling, etc.). Again, fuzzy logic components are illustratively applied to generate a metric indicative of fuel economy, although this is only one example.

Power utilization generator logic 294 illustratively generates a power utilization metric based on sensor signals from sensors 246 (or based on derived engine power used by combine 100, that is derived from sensor signals) under the control of operator 212. The sensors may generate sensor signals indicative of engine usage, engine load, engine speed, etc. The power utilization metric may indicate whether the machine could be more efficiently run at higher or lower power levels, etc.

Overall metric generator logic 296 illustratively generates a metric that is based upon a combination of the various metrics output by logic 288-294. It illustratively provides a metric indicative of the overall operational performance of combine 100, under the operation of operator 212.

Machine benchmark generator logic 298 illustratively generates a machine benchmark metric for each of the metrics generated by items of logic 288-296. The machine benchmark metric can, for instance, reflect the operation of combine 100, under the control of operator 212, for each of the particular metrics, over a previous time period. For instance, the machine benchmark metric for grain loss/savings may be an average of the value of the grain loss/savings metric generated by logic 288 over the prior 10 hours (or over another time period). In one example, machine benchmark generator logic 298 generates such a benchmark metric for each of the categories or metrics generated by items of logic 288-296.

Performance trend generator logic 300 illustratively generates a metric indicative of the performance of machine 100, under the operation of operator 212, over a shorter period of time than is considered by machine benchmark generator logic 298. For instance, performance trend generator logic 300 illustratively generates a trend metric indicating how combine 100 has performed over the previous 30 minutes, in each of the performance categories addressed by items of logic 288-296. In one example, it saves periodically-generated values so that it can generate a trace or continuous depiction of the value of that particular metric over the previous 30 minutes (or other time period). This is described in more detail below.

Figure 4:
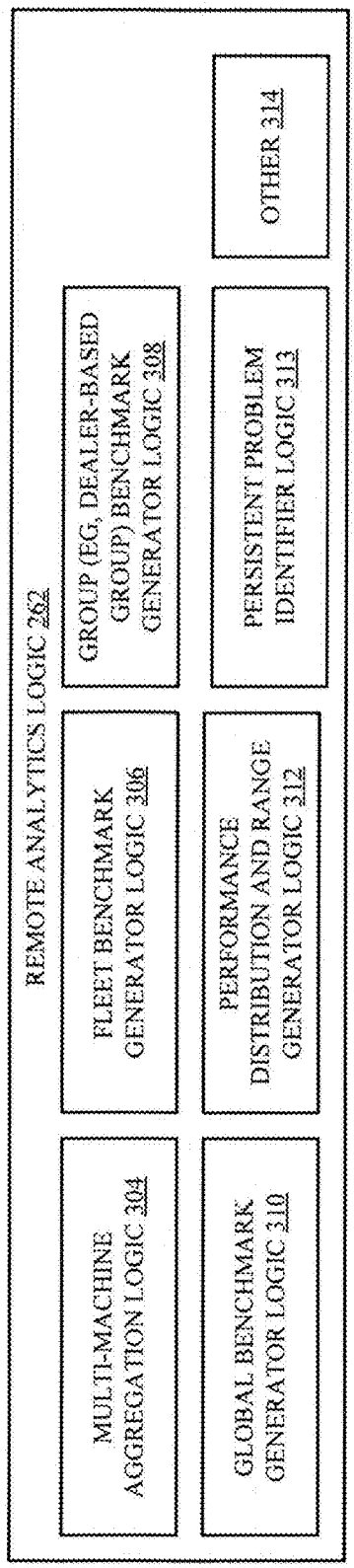
FIG. 4 is a block diagram showing one example of analytics logic in more detail.

FIG. 4 is a block diagram showing one example of remote analytics logic 262 in more detail. FIG. 4 shows that, in one example, remote analytics logic 262 includes multi-machine aggregation logic 304, fleet benchmark generator logic 306, group (e.g., location-based group or other group) benchmark generator logic 308, global benchmark generator logic 310, performance distribution and range generator logic 312, persistent problem identifier logic 313, and it can include a wide variety of other items 314. Multi-machine aggregation logic 304 illustratively aggregates performance information received from a plurality of different combines (including combine 100) and aggregates that information so that it can be stored or retrieved for comparison or other processing. Fleet benchmark generator logic 306 illustratively generates a fleet benchmark metric based upon the multi-machine information aggregated by logic 304. The fleet benchmark metric is illustratively indicative of the performance of a fleet of combines 100 corresponding to a particular organization that are currently harvesting the same crop as combine 100, over the last 10 hours (or other time period). Thus, in one example, fleet benchmark generator logic 306 illustratively generates an average metric indicating the average performance metric, in each of the performance categories discussed above with respect to FIG. 3, for all combines currently operating in the fleet. The average may be calculated based upon the particular performance metric values aggregated for all such combines over the last 10 hours.

Group (e.g., location-based group or other group) benchmark generator logic 308 illustratively generates a similar benchmark metric, except that the number of combines that the metric is generated over is larger than that used by fleet benchmark generator logic 306. Instead, combines from which data is obtained to generate the group benchmark metric may include data from multiple fleets or other groups.

Global benchmark generator logic 310 generates a similar set of metrics (one for each of the performance categories discussed above with respect to FIG. 3), except that the number of combines from which data is obtained to generate the metric is larger than that used by group benchmark generator logic 308. For instance, in one example, global benchmark generator logic 310 may generate a performance metric based upon the performance data obtained from all combines (which are accessible by remote analytics computing system 202) that are harvesting globally in a particular crop. The metric may be generated based on the data aggregated from those combines over the past 10 hours (or other time period).

Performance distribution and range generator logic 312 illustratively identifies a statistical distribution of observed performance values for combines 100. The statistical distribution may be generated in terms of a bell curve so that the performance values are divided into ranges corresponding to a high performance operating range, an average performance operating range and a low performance operating range. These are examples only.

Persistent problem identifier logic 313 illustratively monitors the various performance metrics and information received from a plurality of different combines 100 to determine whether any of the combines are exhibiting a persistent problem. For instance, persistent problem identifier logic 313 can compare the various performance metrics against threshold values to determine whether a particular machine is consistently operating below a desired threshold of operation. By way of example, assume that the measured grain loss/savings metric on a given combine 100 has been running consistently below a desired threshold value. In addition, assume that the measured value of the grain loss/savings metric has been below the threshold value for a threshold time value. The threshold time value may be a predetermined time (such as several minutes), or it may be dynamically determined. In addition, the threshold time value may vary based upon the particular performance metric being analyzed. In the example being discussed, if the performance metric value for the given combine is below the threshold for the threshold amount of time, then persistent problem identifier logic 313 identifies a persistent problem with respect to that combine.

Based on the identification of a persistent problem, logic 313 controls communication system 266 to obtain additional information from the given combine, if needed, and it can also retrieve additional information from data store 264. This information can be provided to user 220 in the form of a notification, an alert, etc. Even if user 220 is not running an application that would otherwise surface this alert or notification, the alert or notification can be processed on computing system 204 (as is discussed in greater detail below) to launch the desired application and to surface the notification/alert for interaction by user 220. In one example, it is surfaced with actuators that allow user 220 to control setting adjustments on the combine with the persistent problem.

Figure 5:
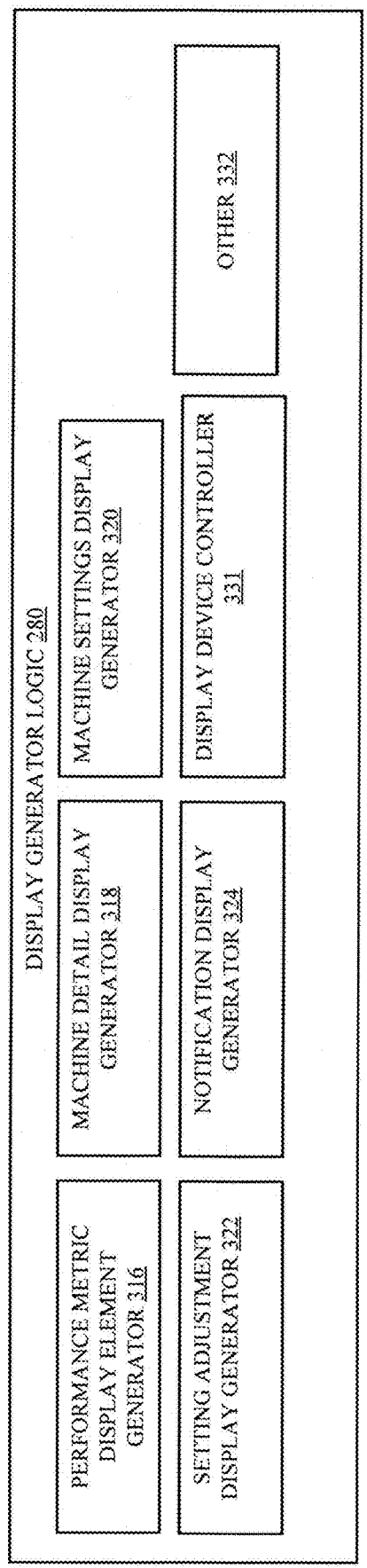
FIG. 5 is a block diagram showing one example of display generator logic in more detail.

FIG. 5 is a block diagram showing one example of display generator logic 280 in the user interface logic 278 of user computing system 204, in more detail. Display generator logic 280 illustratively includes performance metric display generator 316, machine detail display generator 318, machine settings display generator 320, setting adjustment display generator 322, notification display generator 324, display device controller 331 and it can include a wide variety of other items 332.

Performance metric display generator 316 illustratively generates display elements that display the performance metrics for a selected combine, or a group of combines (so that the performance metrics can be compared from one machine to the next). The metrics can be those described above with respect to performance metric generator logic 242 on combine 100 and those generated by the various logic items on remote analytics logic 262.

Machine detail display generator 318 illustratively obtains various machine details (some of which will be described in greater detail below) for a machine under analysis and generates display elements that are indicative of the machine details. For instance, the machine detail display generator 318 can control communication system 276 to obtain near real time sensor signal values from sensors 246 on combine 100, and generate display elements indicative of those sensor signal values. This is just one example.

Machine settings display generator 320 illustratively obtains the current machine settings for the combine 100 under analysis and generates display elements indicative of those machine settings. Some examples of this are shown and described below.

Setting adjustment display generator 322 illustratively generates a setting adjustment display, with setting adjustment actuators that can be actuated by user 220 in order to adjust the settings on the combine being analyzed, or on a set of combines. There are a variety of different adjustment actuators that can be used and some examples are described below.

Notification display generator 324 illustratively generates notification displays based upon notifications or alerts received from other items in architecture 100 It also displays those generated by the application running on user computing system 204.

Display device controller 331 illustratively controls a display device on user computing system 204 in order to display the various elements and displays generated by the items 316-324. Again, some examples of these are described in greater detail below.

Figure 6:
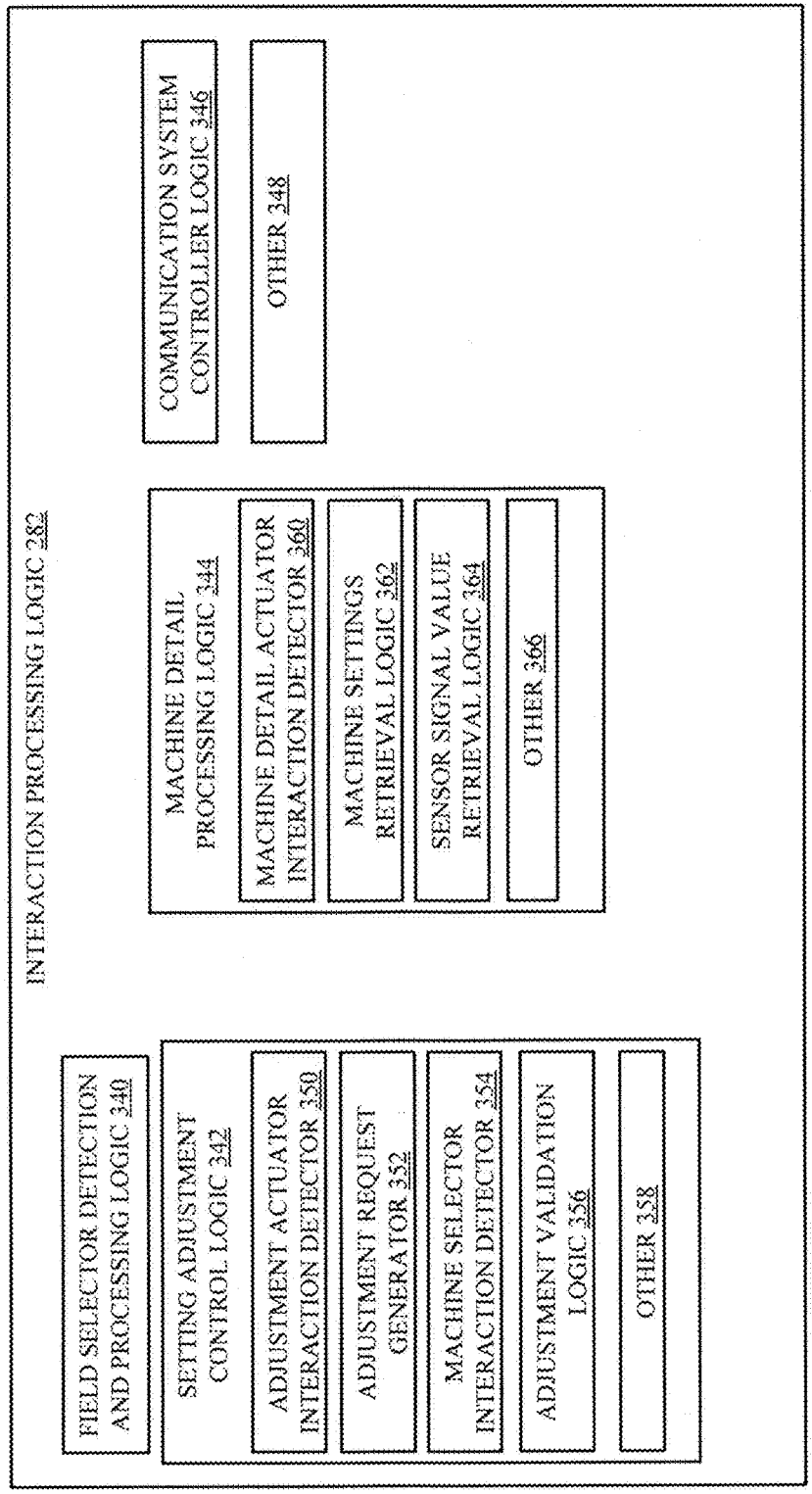
FIG. 6 is a block diagram showing one example of interaction processing logic in more detail.

FIG. 6 is a block diagram showing one example of interaction processing logic 282 (on user computing system 204) in more detail. In the example shown in FIG. 6, interaction processing logic 282 illustratively includes field selector detection and processing logic 340, setting adjustment control logic 342, machine detail processing logic 344, communication system controller logic 346, and it can include a wide variety of other items 348. Setting adjustment control logic 342, itself, illustratively includes adjustment actuator interaction detector 350, adjustment request generator 352, machine selector interaction detector 354, adjustment validation logic 356, and it can include other items 358. Machine detail processing logic 344, itself, illustratively includes machine detail actuator interaction detector 360, machine settings retrieval logic 362, sensor signal value retrieval logic 364, and it can include other items 366.

In operation, and by way of overview, field selector detection and processing logic 340 illustratively detects user actuation of a field selector on a user interface 216. It illustratively retrieves information corresponding to the selected field (such as which combines are operating in that field, the crop planted in the field, the location of the field, etc.). It then controls display generator logic 280 to display information about the combines operating in the selected field.

Machine detail actuator interaction detector 360 detects that user 220 has actuated a user interface element that requests machine details for one or more of the machines operating in the selected field. It then controls communication system 276 to request the machine detail information from the combine itself, or from remote analytics computing system 202, or both. Machine settings retrieval logic 362 also controls communication system 276 to retrieve the machine settings for the machine, based upon user actuation of a corresponding user interface element. Sensor signal value retrieval logic 364 can also control communication system 276 in order to open a secure communication link with combine 100 so that it can receive the near real time sensor signal values from various sensors on combine 100, as they are generated. The secure communication link can be through remote analytics computing system 202, or it can be a direct link or another type of link with combine 100. Communication system controller logic 346 generates the communication system control signals to control communication system 276. It can do this either by itself, or under the direction of other items in FIG. 6.

Adjustment actuator interaction detector 350 illustratively detects user interaction by user 220 of an adjustment actuator that allows a user 220 to adjust the machine settings displayed to user 220. Adjustment request generator 352 illustratively generates an adjustment request that can be sent to one or more machines to adjust the machine settings based upon the adjustment inputs provided through adjustment actuator interaction detector 350.

Machine selector interaction detector 354 illustratively detects user interaction with a machine selector that can be actuated to select a set of machines to which the adjustment requests will be sent. For instance, it may be that user 220 has been assigned responsibility for a plurality of different combines 100. In that case, user 220 can select any of those combines that user 220 is authorized to access (such as those identified in mappings 267 in remote analytics computing system 202) and apply a settings adjustment to all of those machines, or a subset of those machines, by actuating the machine selector, which is detected by interaction detector 354.

Adjustment validation logic 356 validates that the requested adjustments have been made. For instance, after a predetermined timeout period, adjustment validation logic 356 may control machine settings retrieval logic 362 to retrieve the machine settings from those machines for which a settings adjustment has been requested. The machine settings can then be displayed to user 220 so that user 220 can verify that the adjustments have been made. In another example, adjustment validation logic 356 automatically compares the retrieved machine settings to those reflected in the adjustment request that was sent to the machine to determine whether the adjustments have been made. If so, a notice to that effect can be displayed to the user 220. If not, an alert can be generated for user 220 as well.

Figure 7:
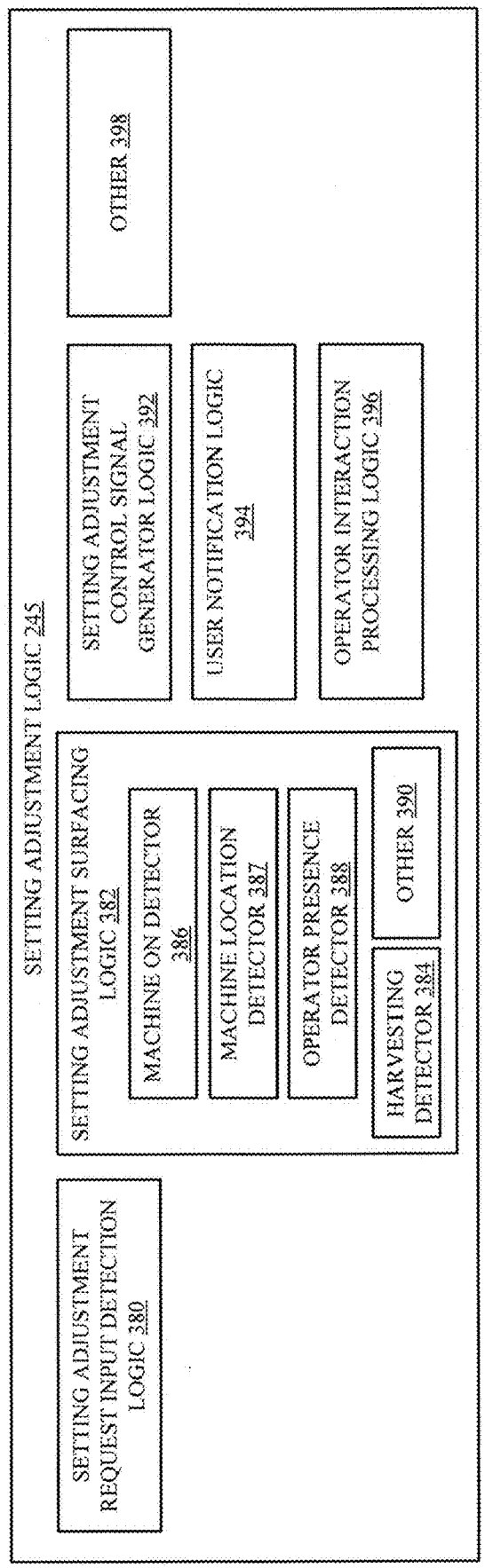
FIG. 7 is a block diagram showing one example of setting adjustment logic in more detail.

FIG. 7 is a block diagram showing one example of setting adjustment logic 245, on combine 100, in more detail. In the example shown in FIG. 7, setting adjustment logic illustratively includes setting adjustment request input detection logic 380, setting adjustment surfacing logic 382 (which itself illustratively includes harvesting condition detector 384, machine on condition detector 386, machine location detector 387, operator presence detector 388, and it can include other items 390), setting adjustment control signal generator logic 392, user notification logic 394, operator interaction processing logic 396, and it can include a wide variety of other items 398.

Setting adjustment request input detection logic 280 illustratively detects when a setting adjustment request has been received through communication system 224, from a user computing system 204. Setting adjustment surfacing logic 382 then surfaces the setting adjustment request, when certain conditions are met. For instance, machine on detector 386 detects whether combine 100 is running, and machine location detector 387 detects whether combine 100 is in a field. Operator presence detector 388 detects whether an operator is present in the operating compartment. Harvesting detector 384 detects whether the combine 100 is performing a harvesting operation (such as whether the header is engaged). Based upon the signals generated by detectors 384-388, it may be that logic 382 determines that conditions are present for surfacing the settings adjustment request to operator 212.

In one example, it may be that the setting adjustment is to be performed automatically. In another example, the setting adjustment is made only after operator 212 accepts the setting adjustment. In the latter example, operator interaction processing logic 396 determines whether the operator 212 has actuated an acceptance actuator to accept the adjustment setting request. If so, or if the setting adjustments are to be made automatically, setting adjustment control signal generator logic 392 generates control signals that are used by control system 224 to control the controllable subsystems 226 in order to make the setting adjustments to the controllable subsystems.

User notification logic 394 then controls communication system 234 in order to send a notification to user computing system 204 that the user has either accepted or declined the setting adjustment request. It can also send a notification that includes the new machine settings, after the adjustment has been made, to confirm that the settings have now been adjusted to conform with the setting adjustment request.

Figure 8A:
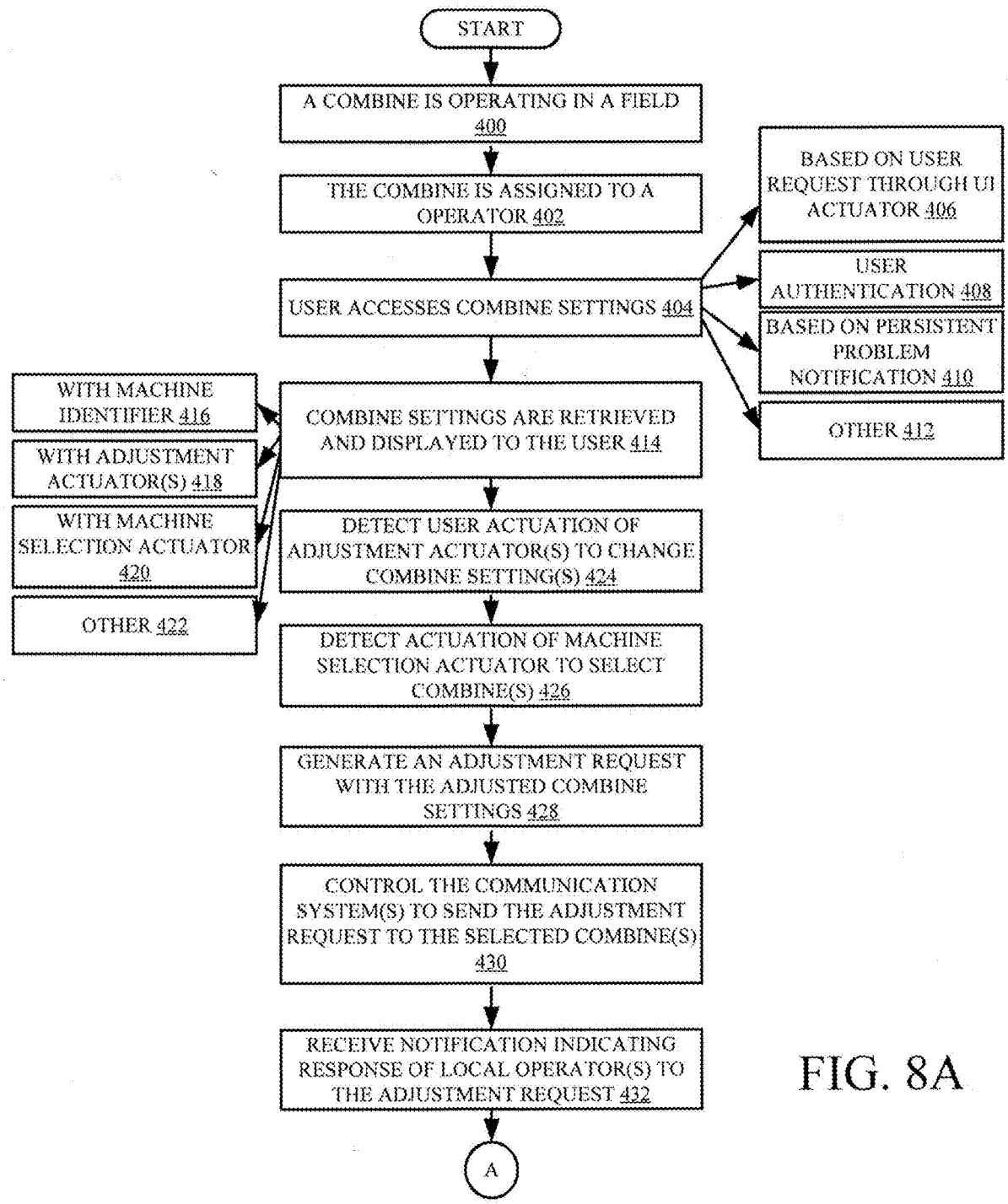
FIGS. 8A and 8B illustrate a flow diagram showing one example of the operation of the computing system in performing a setting adjustment.
Figure 8B:
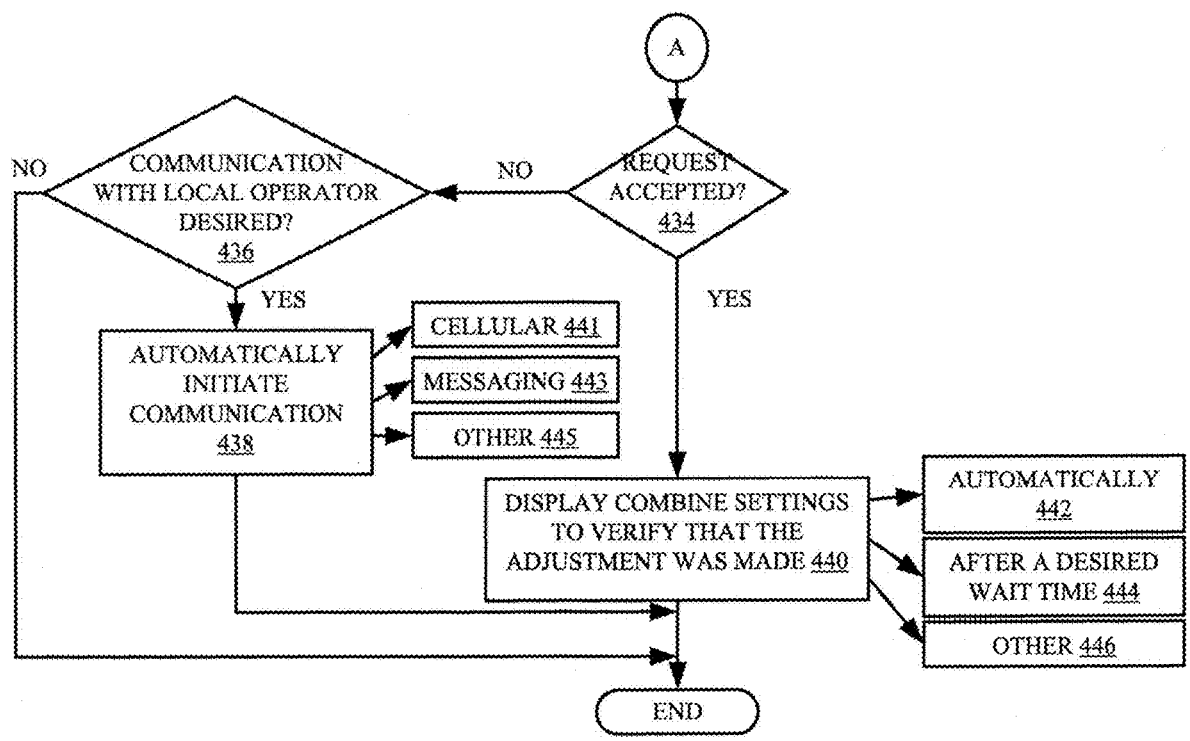

FIGS. 8A and 8B (collectively referred to herein as FIG. 8) illustrate a flow diagram showing the operation of user computing system 204 in allowing user 220 to make a settings adjustment request and transmit it to one or more combines 100. It is first assumed that a combine is operating in a field and that the operating combine is assigned to user 220 (e.g., it is mapped to user 220 by mappings 267). This is indicated by blocks 400 and 402 in the flow diagram of FIG. 8.

Setting adjustment application running logic 274 is illustratively running a setting adjustment application which detects that user 220 has accessed (or provided an input indicating that he or she wishes to review) the machine settings for one or more combines. This is indicated by block 404. This can be done in a variety of different ways. For instance, it may be that user 220 has actuated a user interface actuator generated by the settings adjustment application that allows user 220 to view the machine settings for a combine. This is indicated by block 406. In that case, user authentication will first be performed to ensure that user 220 is authorized to view the settings. This is indicated by block 408. In another example, it may be that persistent problem identifier logic 313 in remote analytics logic 262 has identified a persistent problem with one of the combines that are mapped to user 220. In that case, an alert or notification may be sent to user 220, and the user 220 may be interacting with the notice or alert. The interaction may indicate that user 220 wishes to review the machine settings. This is indicated by block 410. An indication that user 220 wishes to review the machine settings can be identified in a wide variety of other ways as well, and this indicated by block 412.

Machine settings retrieval logic 362 then retrieves the machine settings and controls display generator logic 280 to display those settings to user 220. This is indicated by block 414. The machine settings can be displayed with a machine identifier 416 identifying the particular combine they are from. They can be displayed with one or more adjustment actuators 418 that allow user 220 to make adjustments to the machine settings. They can be displayed with machine selection actuator 420 that allows user 220 to select various machines to which the setting adjustment is to be applied. They can be displayed in other ways as well, and this is indicated by block 422.

At some point, adjustment actuator interaction detector 350 detects that user 220 has interacted with the adjustment actuator(s) to provide a settings adjustment that user 220 wishes the combine to make. Detecting user actuation of an adjustment actuator to change the combine settings is indicated by block 424.

User 220 may so actuate the machine selector to select one or more machines (that the user is authorized to access) to apply the machine settings adjustment to all of the selected machines. This type of user interaction with the machine selector is detected by machine selector interaction detector 354, and detecting that actuation is indicated by block 426 in the flow diagram of FIG. 8.

Adjustment request generator 352 then generates a settings adjustment request that will be sent to the selected machines. In one example, adjustment request generator 352 allows user 220 to configure an adjustment request template which identifies machine settings values (or adjustments) that are to be made on the machines that the request is sent to. Generating an adjustment request with the adjusted combine settings is indicated by block 428.

Adjustment request generator 352 then uses communication system controller logic 346 to control communication system 276 in order to send the adjustment request to the selected combines. This is indicated by block 430. The selected combines then process the adjustment settings request, as is described in greater detail below with respect to FIGS. 10A-10B, and adjustment validation logic 356 then receives a notification indicating the operator's response to the adjustment request. This is indicated by block 432. It will be noted that, when multiple combines receive the setting adjustment request, a notification will be received indicating the operator response, from each of those combines.

In one example, the operator can either accept the setting adjustment request or decline it. A determination as to whether the setting adjustment request was accepted is indicated by block 434. If it was declined, then it may be that the settings adjustment application is configured to initiate communication between user 220 and operator 212 to determine why the request was declined. If that is the case, the application controls communication system 276 to automatically initiate communication with operator 212. This can be done using cellular communication, messaging, or any of a wide variety of other communication systems. Determining whether communication with the local operator is desired and, if so, automatically initiating that communication, are indicated by block 436 and 438 in the flow diagram of FIG. 8, respectively. Initiating cellular communication is indicated by block 441, initiating messaging communication is indicated by block 443, and initiating other types of communication is indicated by block 445.

If, at block 434, it is determined that the operator accepted the settings adjustment request, then adjustment validation logic 356 automatically uses machine settings retrieval logic 362 to again retrieve the machine settings from the combine for which the adjustment has been requested, and controls display generator logic 280 to display the new combine settings to verify that the adjustment was made. This is indicated by block 440 in the flow diagram of FIG. 8. This can be done automatically as indicated by block 442, it can be done after a desired time period (which may allow the operator to initiate the machine settings adjustment) as indicated by block 444, and it can be done in a variety of other ways as well, as indicated by block 446.

Figure 9A:
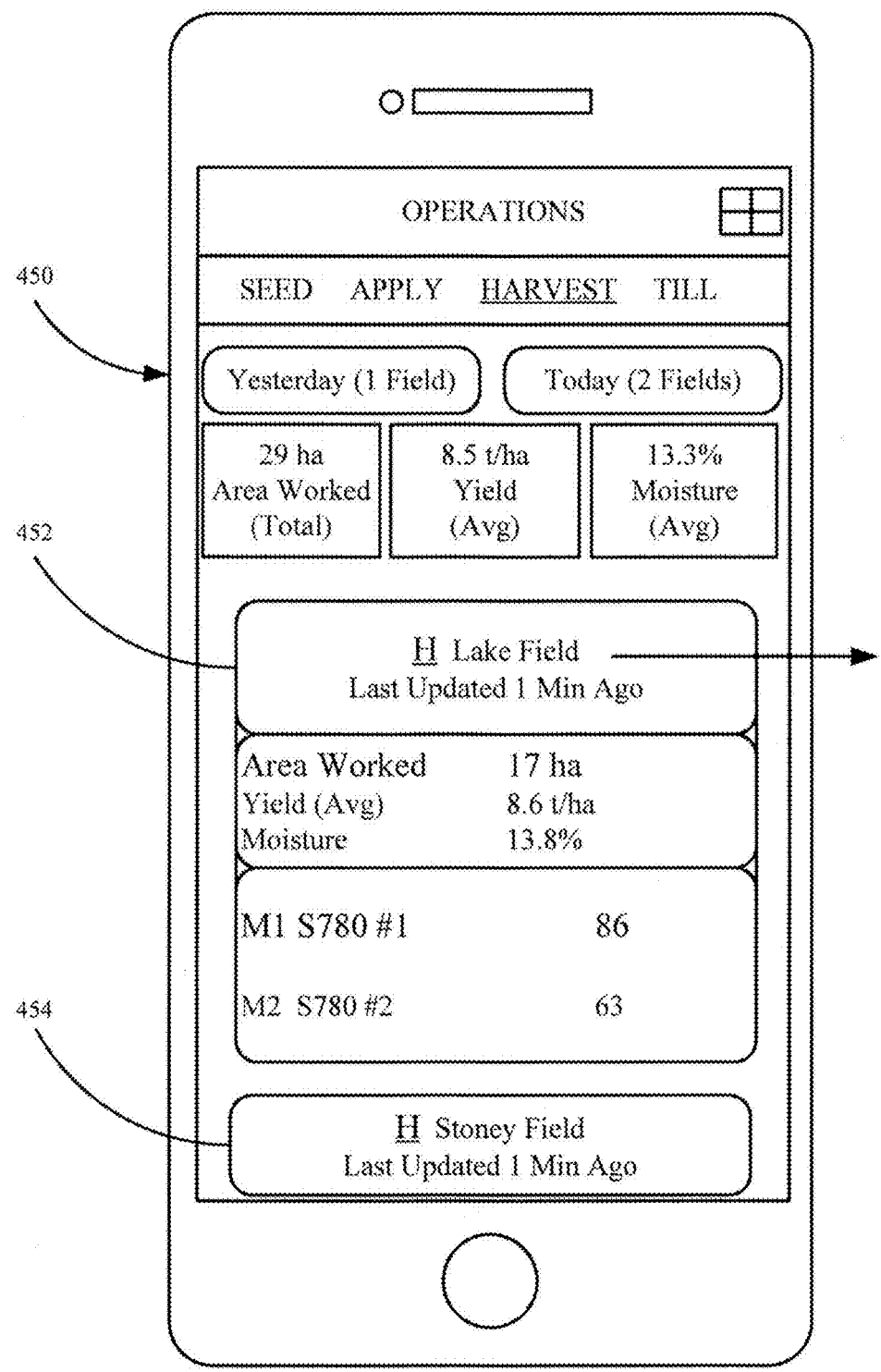
FIGS. 9A-9E show examples of user interface displays that can be generated on the computing system.

FIGS. 9A-9E show a series of user interface displays that can be generated by user computing system 204, and that allow user 220 to generate a setting change request that can be sent to one or more combines 100. FIG. 9A shows a user interface display 450 that displays field display elements 452 and 454, each of which corresponds to a different field that has combines operating in it, and for which user 220 has been assigned responsibility. The user illustratively actuates actuator 452, and a performance display 456 (such as that shown in FIG. 9B) is generated. Performance display 456 illustratively displays a set of performance metrics generally illustrated at 458, which show performance metrics for each of the different combines operating the selected field. It can display trend data 460 that shows the value of a selected performance metric (selected using metric selector 464) for a selected machine (selected using machine selector 462). Display 456 also includes a machine detail actuator 466 that can be actuated to view additional machine details for the selected machine. Further, it includes a machine settings display 468 that displays the machine settings for the selected machine, and it includes an adjustment actuator 470 that can be used to make machine setting adjustments.

Figure 9B:
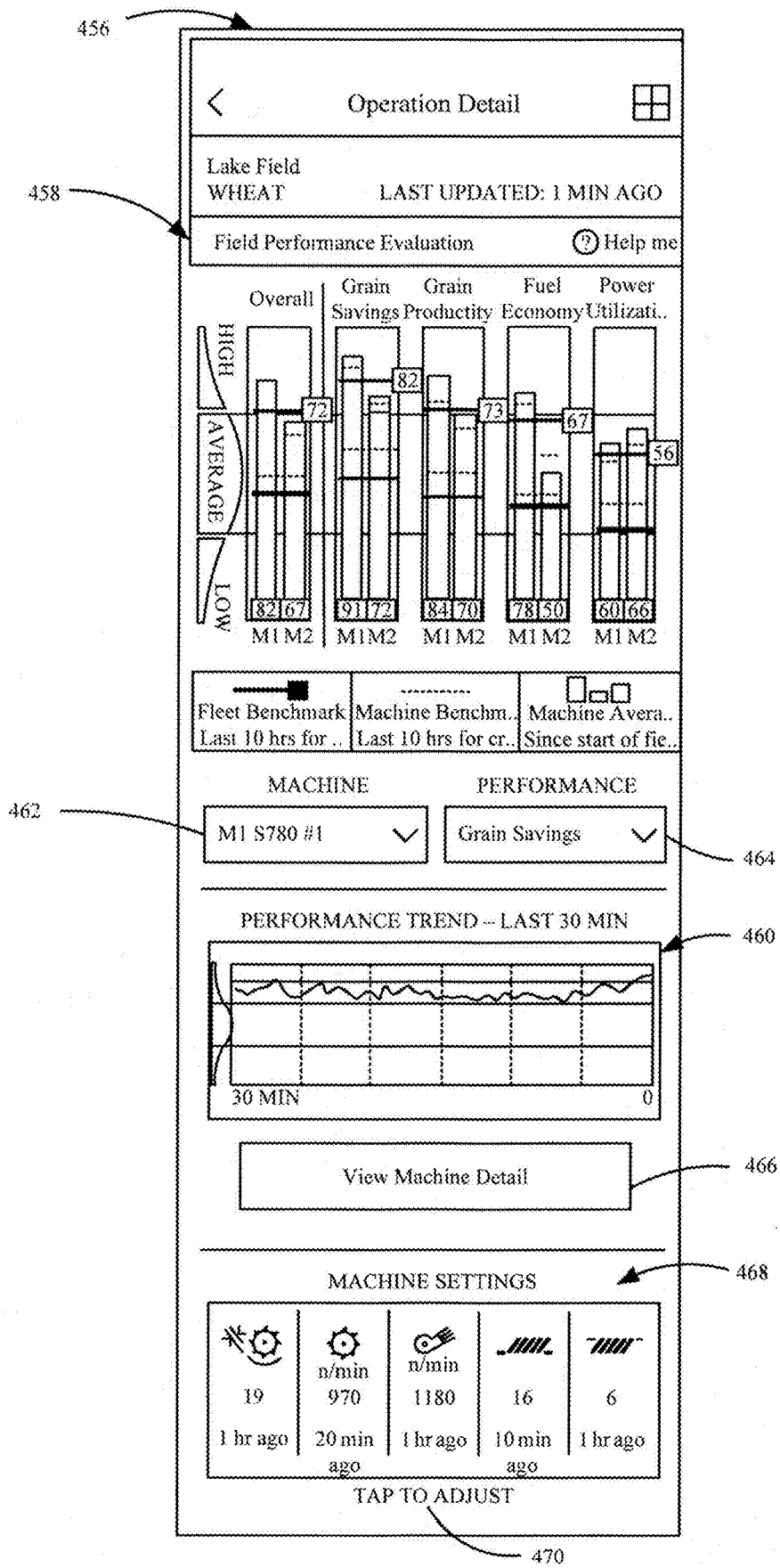
Figure 9C:
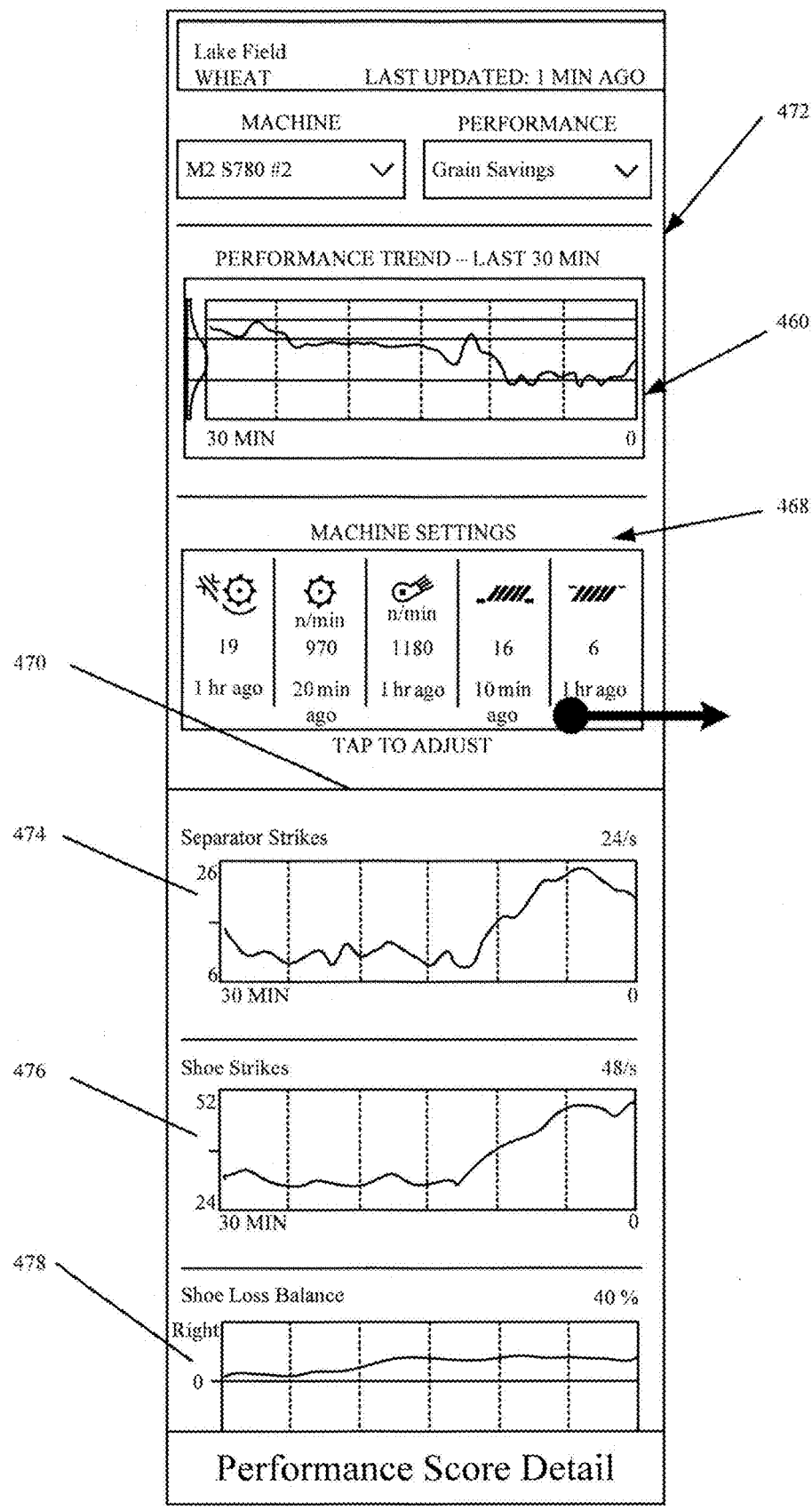

FIG. 9C shows a machine detail display 472 that can be generated in response to the user actuating the machine detail actuator 466. That actuation will be detected by machine detail actuator interaction detector 360 (shown in FIG. 6) which will then control display generator logic 280 to display the machine details illustrated.

It can be seen in FIG. 9C that display 472, in addition to the trend display 460 and the machine settings display 468, can also display the value of one or more sensor signals generated by sensors 246 on the selected combine 100, in near real time. In the example shown in FIG. 9C, the displayed sensor signal values are generated by the separator strike sensor (shown at 474), and the shoe strike sensor (shown at 476) along with the shoe loss signal values generated by the shoe loss sensor (and shown generally at 478). Again, a machine settings adjustment actuator 470 is also displayed on user interface display 472.

Figure 9D:
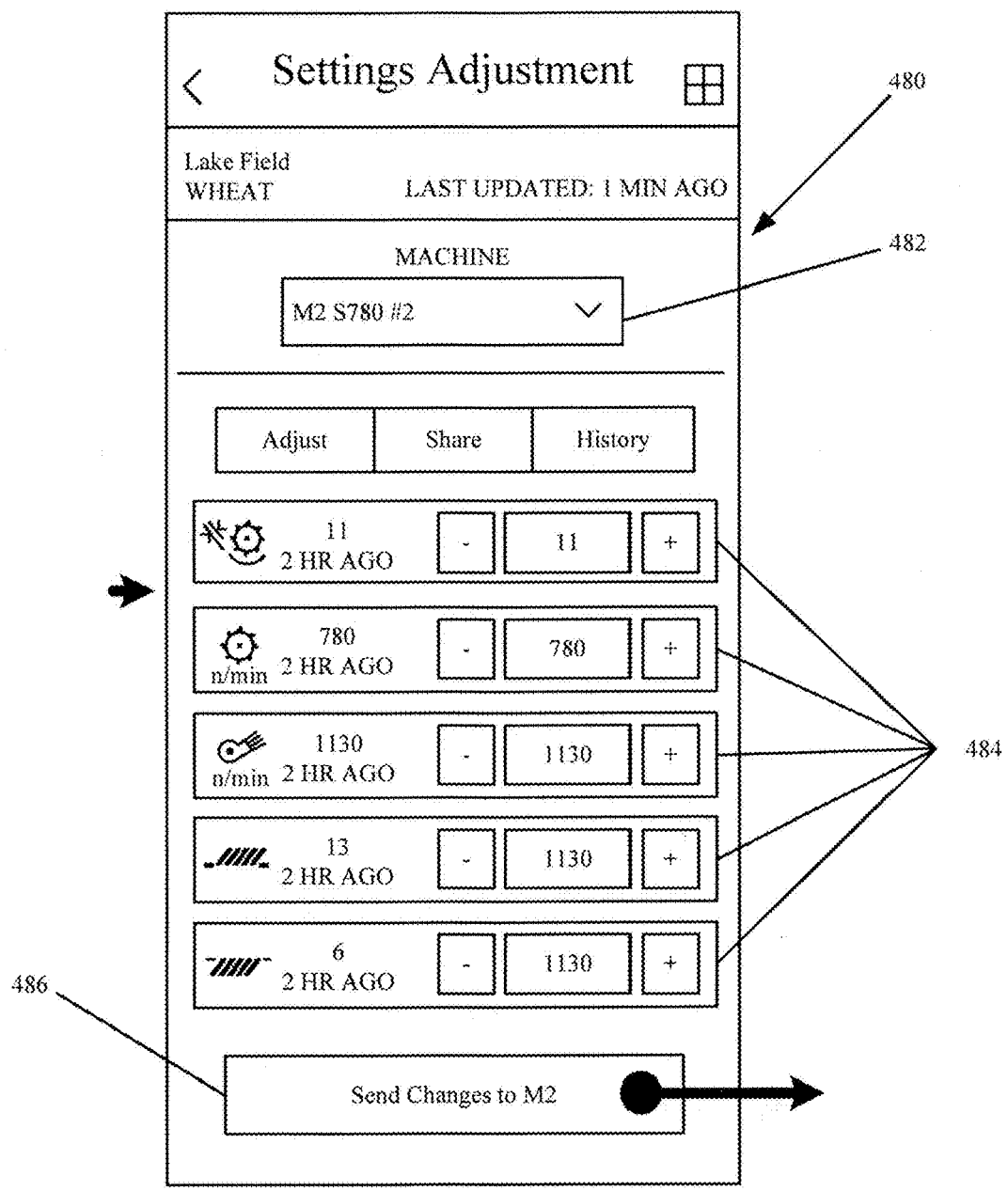

FIG. 9D shows a setting adjustment display 480 that can be displayed if the user actuates the settings adjustment actuator 470 on either user performance display 456 shown in FIG. 9B or the machine detail display 472 shown in FIG. 9C. In the example illustrated, display 480 illustratively includes a machine selector actuator 482 that can be actuated by user 220 in order to select one or more machines that the adjustment is to be applied to. It includes adjustment actuators 484, for each of the machine settings that can be adjusted. In the example shown in FIG. 9D, the adjustment actuators 484 include plus and minus actuators that can be actuated by user 220 in order to increase or decrease the corresponding setting value, respectively. The actuation of the adjustment actuators shown generally at 484 is detected by adjustment actuator interaction detector 350 (shown in FIG. 6).

When the user 220 is finished making adjustments to the machine settings, the user illustratively actuates a send actuator 486. In response, adjustment request generator 352 (also shown in FIG. 6) generates an adjustment request to the machines selected by selector 482, and uses communication controller logic 346 to control communication system 276 to send an adjustment request to the identified machines. Once the adjustment request has been sent to one or more combines, the adjustment request is processed on those machines as indicated in the flow diagram of FIGS. 10A and 10B, below.

Figure 9E:
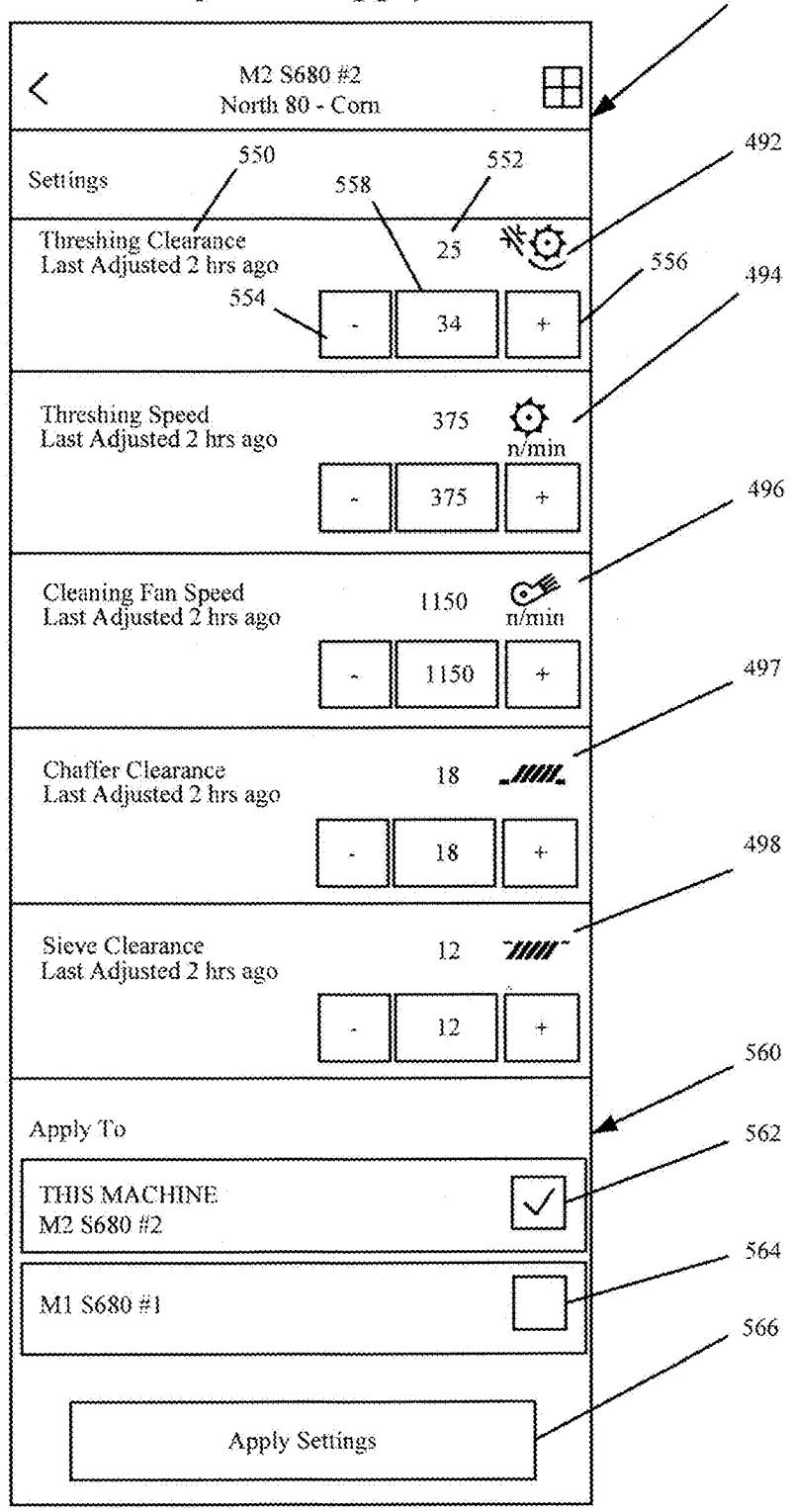

FIG. 9E shows another example of a settings adjustment user interface display 490. It can be seen that user interface display 490 includes a settings display corresponding to each of the machine settings that can be adjusted by user 220. For instance, display 492 corresponds to threshing clearance. Display 494 corresponds to threshing rotor speed.

Display 496 corresponds to cleaning fan speed. Display 497 corresponds to chaffer clearance, and display 498 corresponds to sieve clearance. Each of the settings displays 492-498 illustratively includes a textual portion describing the text and when it was last adjusted, a current value for the setting, a set of adjustment actuators that allow the value to be increased or decreased, and an adjusted value for the setting after adjustment by user 220.

For instance, the threshing clearance setting display 492 includes textual portion 550 that textually describes the setting corresponding to display 492. The textual portion 550 also indicates when it was last adjusted. Settings display 492 also includes a current setting value 552 which shows the current setting value, that is currently set on the combine 100 for the threshing clearance. Setting display 492 also includes a set of actuators 554 and 556 that can be actuated by user 220 in order to increase or decrease the setting value, respectively. Display 492 also includes an adjusted value display portion 558 which shows the adjusted value for the setting, after it has been adjusted by user 220 using actuators 554 and/or 556.

User interface 490 also illustratively includes a machine selector display portion 560 which illustratively shows a selectable display element corresponding to each of the machines that are operating in the selected field, or for each of the machines that user 220 is authorized to access. In the example shown in FIG. 9E, display section 560 includes a selectable display actuator for machine M2, as shown generally at 562, and a selectable display actuator for machine M1, as shown generally at 564. The user can illustratively actuate the selectable actuators in order to select or deselect the machines to which the setting adjustment is to be applied. In the example shown in FIG. 9E, it can be seen that the user has actuated actuator 562 in order to select machine M2, but has not actuated actuator 564 in order to select machine M1.

Once the user has adjusted each of the settings using the adjustment actuators, and once the user has selected the machines that the setting adjustments are to be applied to, user 220 can actuate the apply settings actuator 556. In response, adjustment request generator 362 (shown in FIG. 6) generates a settings adjustment request and uses communication system controller logic 346 to control communication system 276 to send the settings adjustment request to all of the machines selected by user 220 with selection actuators 562-564. Again, once the settings adjustment request has been sent to the selected machines, the request is processed at each of those machines as described below with respect to FIGS. 10A and 10B.

Figure 10A:
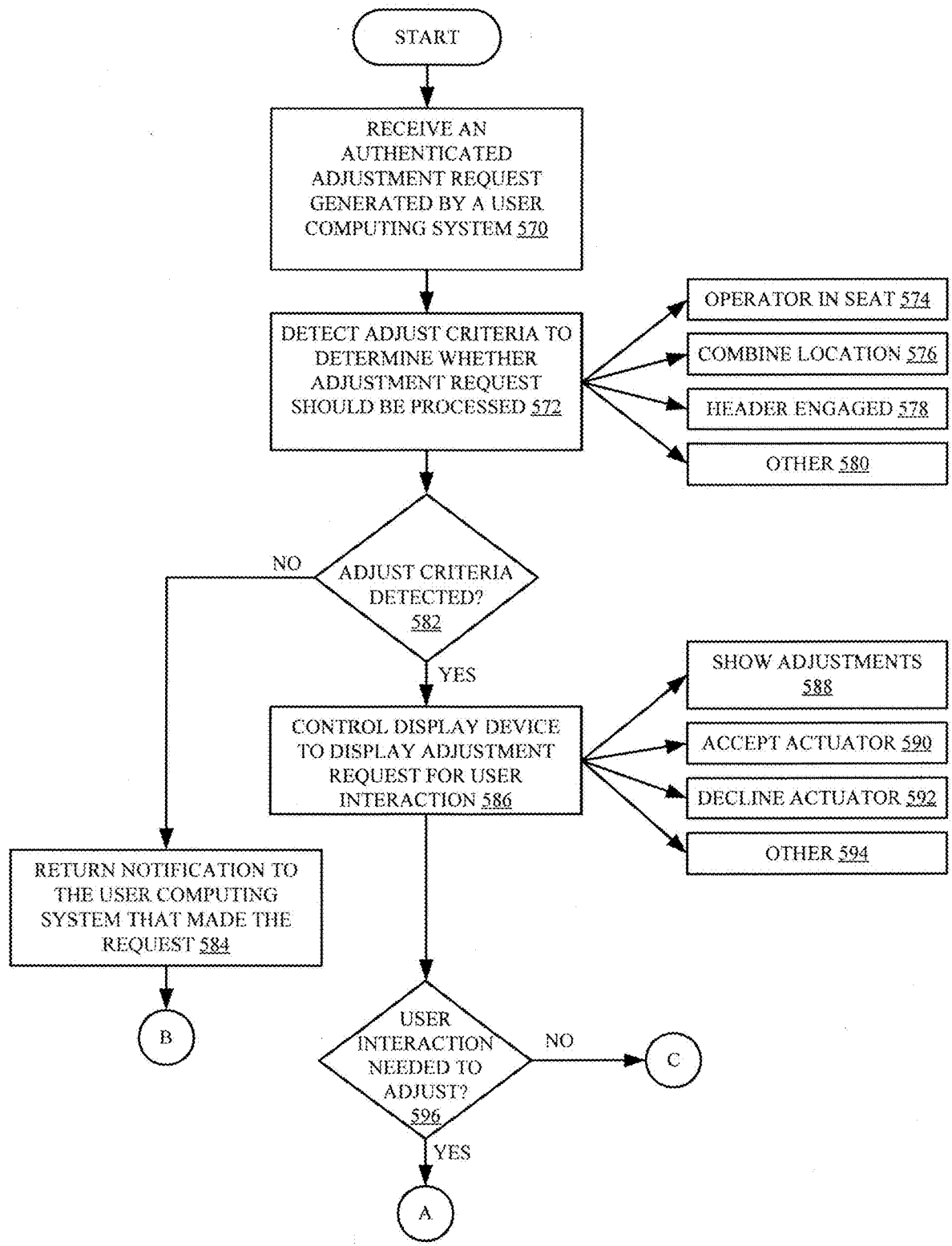
FIGS. 10A and 10B illustrate a flow diagram showing one example of the operation of setting adjustment logic on a combine.
Figure 10B:
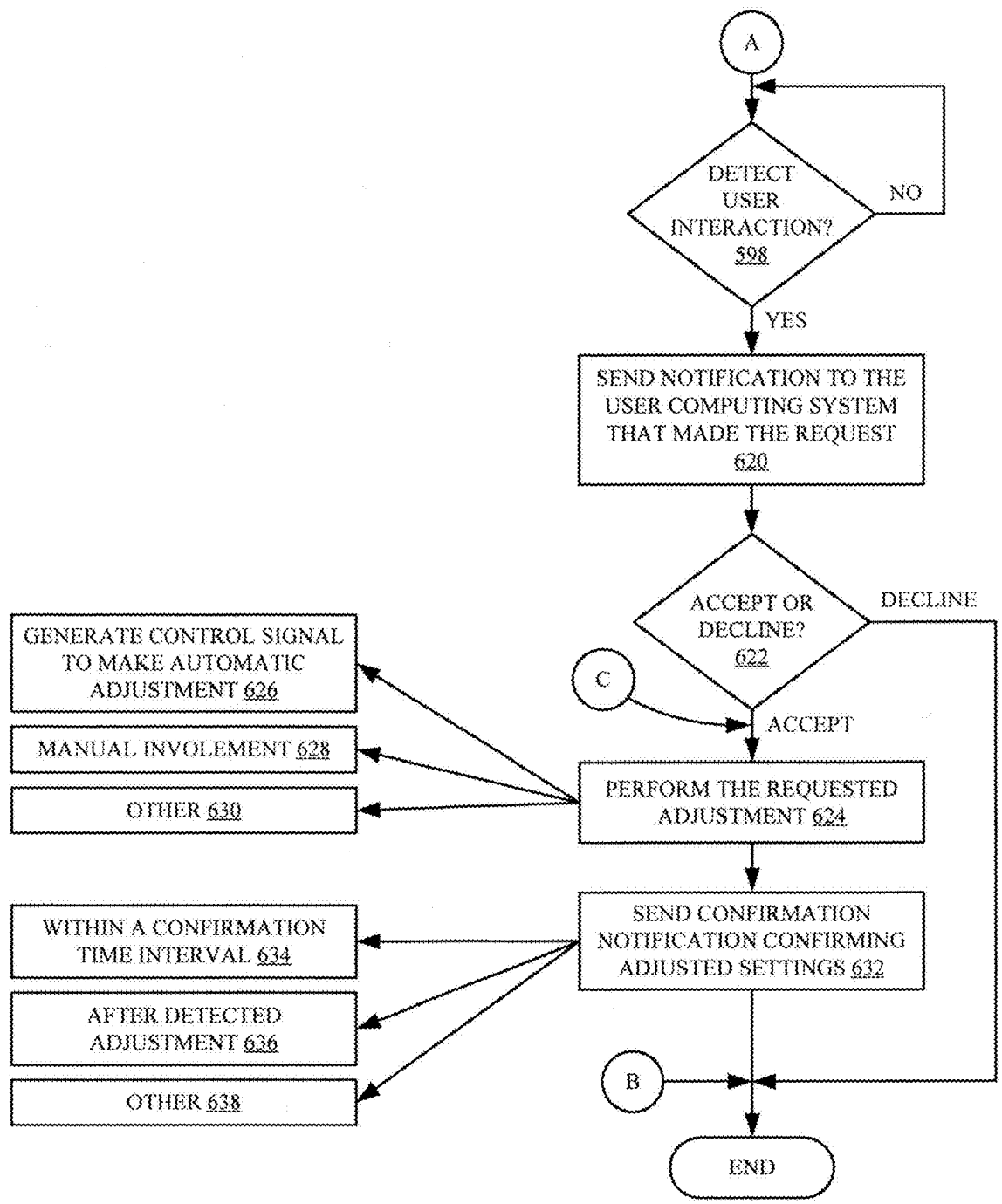

FIGS. 10A and 10B (collectively referred to herein as FIG. 10) show a flow diagram illustrating one example of the operation of setting adjustment logic 245 (shown in more detail in FIG. 7) in processing a setting adjustment request that is received from a user computing system 204. Setting adjustment request input detection logic 380 first receives an authenticated adjustment request generated by a user computing system 204. This is indicated by block 570 in the flow diagram of FIG. 10.

Setting adjustment surfacing logic 382 then detects whether adjust criteria are present so that the adjustment request should be surfaced for operator 212. This is indicated by block 572. For instance, it may be that the application does not surface adjustment requests if the operator is driving the combine down the road, instead of harvesting in a field. It may be that the application will not surface a request if the combine is idle, or if the operator is out of the operator compartment. These are examples only. However, in those examples, operator presence detector 388 illustratively detects operator presence within the operator compartment. This is indicated by block 574. Machine location detector 387 may detect a current location of combine 100 and determine whether it is indeed within a field, whether it is travelling down the road, etc. Detecting combine location is indicated by block 576. Machine on detector 386 can detect whether the combine is on or off. Harvesting detector 384 may then illustratively detect whether the combine 100 is performing a harvesting operation, such as whether the header is engaged. This is indicated by block 578. Other adjust criteria can be detected as well. This is indicated by block 580.

If the adjust criteria are not detected, as indicated by block 582, then user notification logic 394 (shown in FIG. 7) generates a notification and returns it to the user computing system 204 that generated the adjustment request. This is indicated by block 584 in FIG. 10. However, if, at block 582, it is determined that the adjust criteria are detected, then operator interaction processing logic 396 illustratively controls user interface logic 230 to display the adjustment request for interaction by operator 212. This is indicated by block 586 in the flow diagram of FIG. 10. In one example, the user interface display shows the adjustments requested as indicated by block 588, along with an accept actuator 590, and a decline actuator 592. A wide variety of other information can be displayed as well. This is indicated by block 594.

Setting adjustment control signal generator logic 392 then determines whether user interaction is needed in order to make the adjustments. For instance, it may be that some combines are configured to automatically make adjustments to the settings, based upon a setting adjustment request. It may be that other combines are configured such that setting adjustments will not be automatically made, without the local operator authorizing or accepting those adjustments. Determining whether user interaction is needed to make the adjustments is indicated by block 596 in the flow diagram of FIG. 10. If so, then setting adjustment control signal generator logic 392 determines whether operator interaction processing logic 396 has detected that the operator 212 has interacted with either the accept or decline actuators. This is indicated by block 598 in the flow diagram of FIG. 10. Once the user has interacted (either accepted or declined the requested setting adjustment), user notification logic 394 generates a notification indicative of the operator interaction and controls communication system 234 to communicate the notification to user computing system 204, where it can be surfaced for user 220. Sending the notification to the user computing system that made the request is indicated by block 620 in the flow diagram of FIG. 10. The user interaction will either be to accept or decline the requested adjustment. Making this determination is indicated by block 622.

If, at block 622, it is determined that the user has accepted the adjustment request, or if, at block 596, it is determined that no user interaction is needed to make the adjustments, then setting adjustment control signal generator logic 392 generates control signals that are provided to control system 236, and are used to control the controllable subsystems 226 in order to make the identified adjustments. Performing the adjustments is indicated by block 624. Generating control signals to make the adjustments automatically, is indicated by block 626. Making the adjustment based on manual involvement (such as having the user manually accept the adjustment request, or manually make the adjustments), is indicated by block 628. Making the adjustment in other ways (such as in a semi-automatic way) is indicated by block 630.

Once the adjustments are made, then, again, user notification logic 394 sends a confirmation notification, confirming that the adjusted settings have been reached. This is indicated by block 632. In one example, the notification is sent within a confirmation time interval so that user 220 can determine, within a reasonable time, that the requested adjustments have been made. Sending the notification within a confirmation time interval is indicated by block 634. In another example, the notification can be sent only after the adjustments have been made. This is indicated by block 636. The notification can be sent in other ways as well, and this is indicated by block 638.

Figure 11:
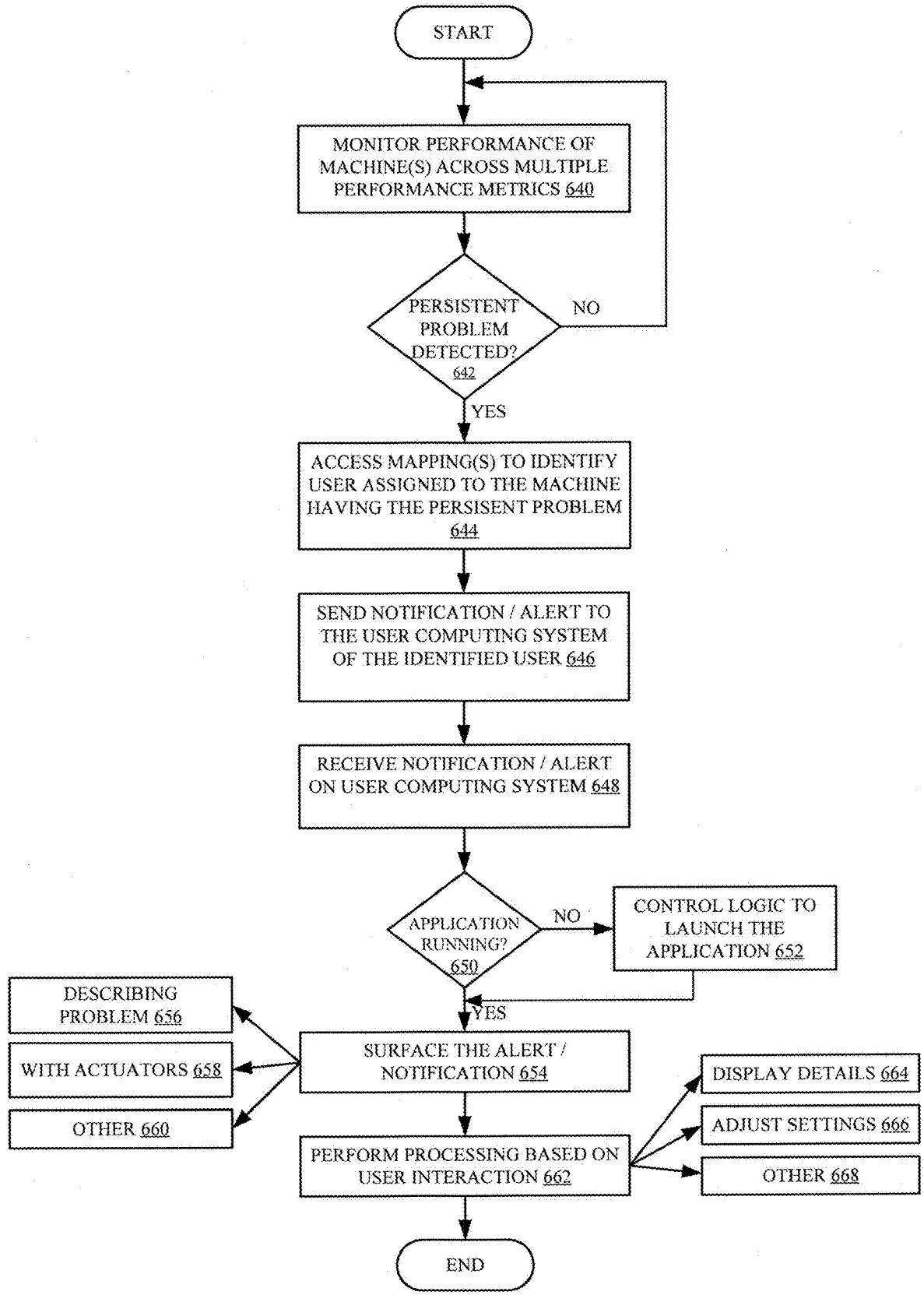
FIG. 11 is a flow diagram illustrating one example of the operation of a remote analytics computing system.

FIG. 11 is a flow diagram illustrating one example of the operation of remote analytics logic 262 in determining whether a particular combine exhibits a persistent problem. Recall, as mentioned above, that user 220 may be automatically notified when a persistent problem with a particular combine 100 has been detected. In order to do this, remote analytics logic 262 (shown in more detail in FIG. 4) monitors performance of the various machines, across the multiple performance metrics discussed above. This is indicated by block 640 in the flow diagram of FIG. 11. Persistent problem identifier logic 313 then determines whether a persistent problem exists with one or more of the combines 100. This is indicated by block 642 and it can be done in a wide variety of different ways.

For instance, it may be that one or more of the performance metrics are more important than the others. In that case, the more important performance metrics can be monitored to determine whether the performance metric values for a combine meet a desired threshold value. If not, and if it fails to meet the desired fresh threshold value for a sufficient length of time (which may be fixed or variable), then it may be that persistent problem identifier logic 313 determines that the combine has a persistent problem. It may be that all of the performance metrics are monitored and if any of them fail to meet a desired threshold value, for a threshold amount of time, that a persistent problem is identified. It may be that a persistent problem is identified if certain combinations of metrics fail to meet the threshold value, or in a wide variety of other ways.

If persistent problem identifier logic 313 identifies that a combine has a persistent problem, then it accesses the user-to-combine mappings 267 in data store 264 to identify the user who is assigned to the machine that is having the persistent problem. This is indicated by block 644. It then uses communication system 266 to send a notification or alert to the user computing system of the identified user. This is indicated by block 246. The notification or alert may identify the particular combine 100 having the problem, the nature of the problem, it may include the machine settings or recent values for performance metrics taken on the combine, or it can include a wide variety of other information.

The identified user computing system 204 then receives the notification or alert, as indicated by block 648. On the user computing system, it may be that the application that is used to monitor and adjust machine settings for combines 100 is not running. If it is not running, as indicated by block 650, then the application running logic 274 automatically launches the application, based upon the received notification or alert. This is indicated by block 652.

Once the application is running, it uses user interface logic 278 to display the alert or notification for user 220. It can be surfaced in other ways as well, such as using an audible alert, a haptic alert, etc. Surfacing the alert is indicated by block 654.

Again, the alert can describe the nature of the problem as indicated by block 656, it can include actuators for adjusting the machine settings, as indicated by block 658, and it can include a wide variety of other items as indicated by block 660.

Interaction processing logic 282 then performs any processing based on user interactions with the alert. This is indicated by block 662. For instance, the user 220 may actuate a machine details actuator to see additional machine details, such as the current (or near real time) sensor signal values, the current (or near real time) performance metric values, various conditions on the combine, etc. Viewing display details in this way is indicated by block 664. The user may actuate actuators to adjust the settings as indicated by block 666. The user may provide other inputs so that user interaction processing logic 282 performs other processing and control steps as well, and this is indicated by block 668.

As mentioned above, in some instances a user, such as a remote operator, desires to set machine settings for two (or more) combines to similar values and/or to have similar performance (e.g., the same overall performance scores, the same performance pillar scores, etc.). For sake of illustration, but not by limitation, Table 1 below shows a set of example combine settings that user 220 sets for two combines (i.e., combine M1 and combine M2), using the example user interface of FIG. 9D.

TABLE 1

| THRESHING CLEARANCE | 11 |
|---|---|
| THRESHING SPEED | 780 n/min (RPM) |
| CLEANING FAN SPEED | 1130 n/min |
| CHAFFER OPENING | 13 |
| SIEVE OPENING | 6 |

With these same settings, user 220 expects similar performance for both combines. However, due to performance bias between those two machines (due to various sources of bias, such as those mentioned above), even if these same settings are applied to both machines (and both machines are operating in similar conditions) they may not result in similar performance (e.g., combine M1 has a performance score of 62 and combine M2 has a performance score of 78).

Figure 12:
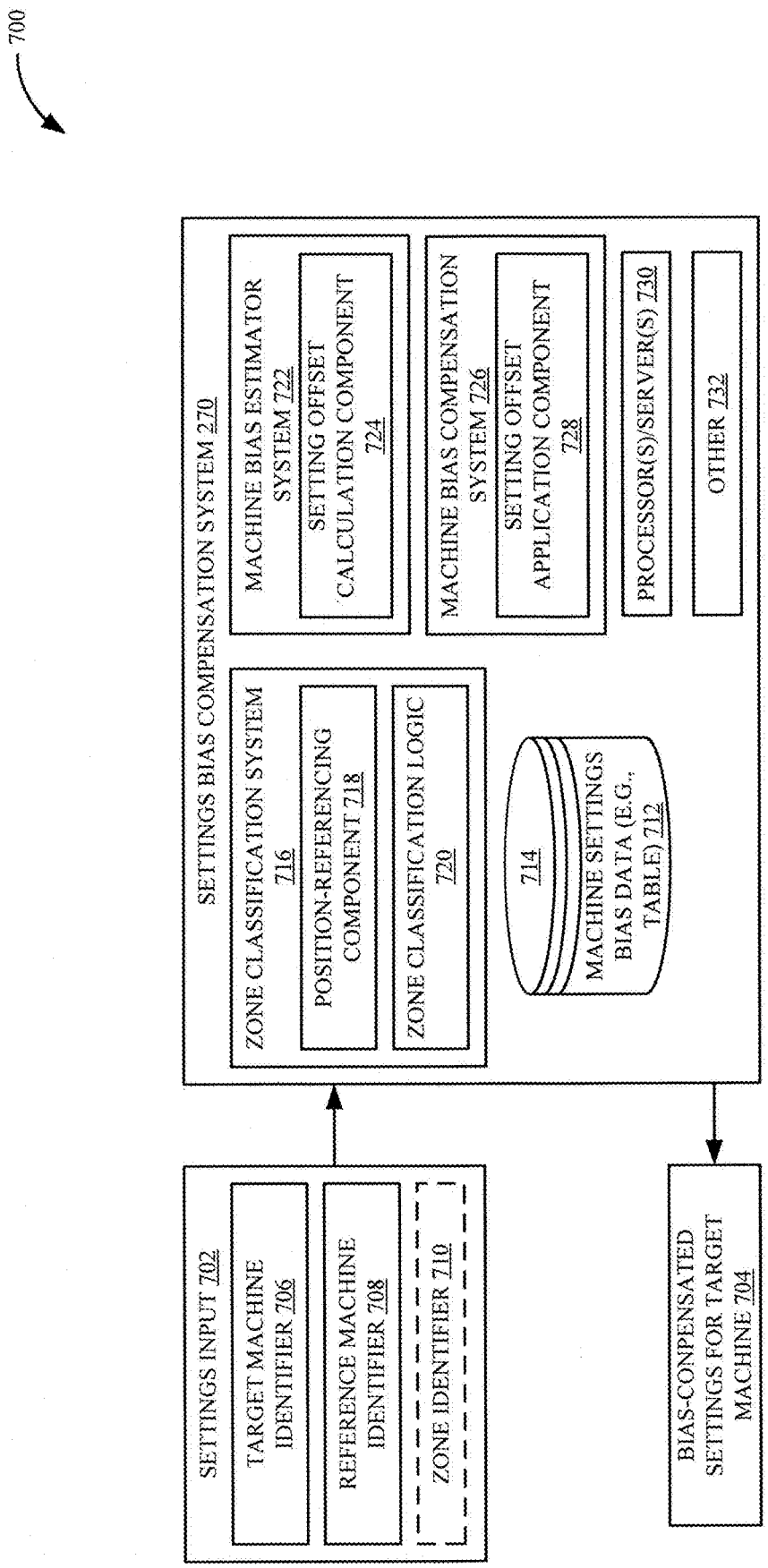
FIG. 12 is a block diagram of one example of a setting bias compensation system configured to generate bias-compensated settings for a target machine.

FIG. 12 illustrates one example of setting bias compensation system 270, illustrated above with respect to FIG. 2. As also noted above, system 270 can comprise a system separate from combine 100, system 202, and/or system 204. In another example, system 270, or parts thereof, can be incorporated into one or more of the above-mentioned machines/systems.

System 270 is configured to receive a settings input 702 that is associated with a target machine, and to generate bias-compensated (adjusted) settings 704 for the target machine based on settings input 702. Settings input 702 can include a target machine identifier 706 that identifies the target machine and a reference machine identifier 708 that identifies at least one other reference machine on which settings 704 is to be based. For example, the reference machine can comprise a particular, second machine, a number of machines within a fleet, or an entire fleet of machines.

Further, settings input 702 can include a zone identifier 710 that identifies a particular work zone in which the target machine is to be operated with settings 704. For the sake of the present discussion, a work zone (or zone) refers to a work area in which a machine is operating, or can be operated. For instance, a zone may refer to an agricultural field, or portion thereof, having a crop to be harvested by combine 100.

As discussed in further detail below with respect to example methods in FIGS. 13-16, settings 704 are determined based on machine settings bias data 712 stored in a data store 714 associated with system 270. This can include, but is not limited to, a bias table that maps setting offsets to particular machines. Before discussing FIGS. 13-16 in further detail, and overview of system 270 will be provided.

System 270 includes a zone classification system 716 configured to classify zones based on sensor data associated with machines operating in those zones. System 716 includes a position-referencing component 718 and zone classification logic 720. Position-referencing component 718 is configured to receive, or otherwise obtain, location data associated with the sensor data. The location data can be generated by a location system that includes a component that outputs a current geographical location (such as location data from a GPS system) of the sensor(s) that generates the sensor data. This can include, for instance, a global positioning system (GPS) receiver, a LORAN system, a dead reckoning system, a cellular triangulation system, or other positioning system. The location data is utilized to geo-reference the sensor data for use by zone classification logic 720, in classifying or otherwise identifying corresponding zones (e.g., having comparable conditions), which is discussed in further detail below.

System 720 also includes a machine bias estimator system 722 configured to estimate performance bias(es) between machines, which is stored as machine settings bias data 712. Illustratively, system 722 includes a setting offset calculation component 724 configured to calculate settings offset between machines. This is discussed in further detail below.

System 270 also includes a machine bias compensation system 726 configured to compensate for machine bias by applying the machine settings bias data 712. Illustratively, system 726 includes a setting offset application component 728 configured to apply settings offset in generating bias-compensated settings 704.

System 270 can include one or more processors and/or servers 730, and can include other items 732 as well.

Figure 13:
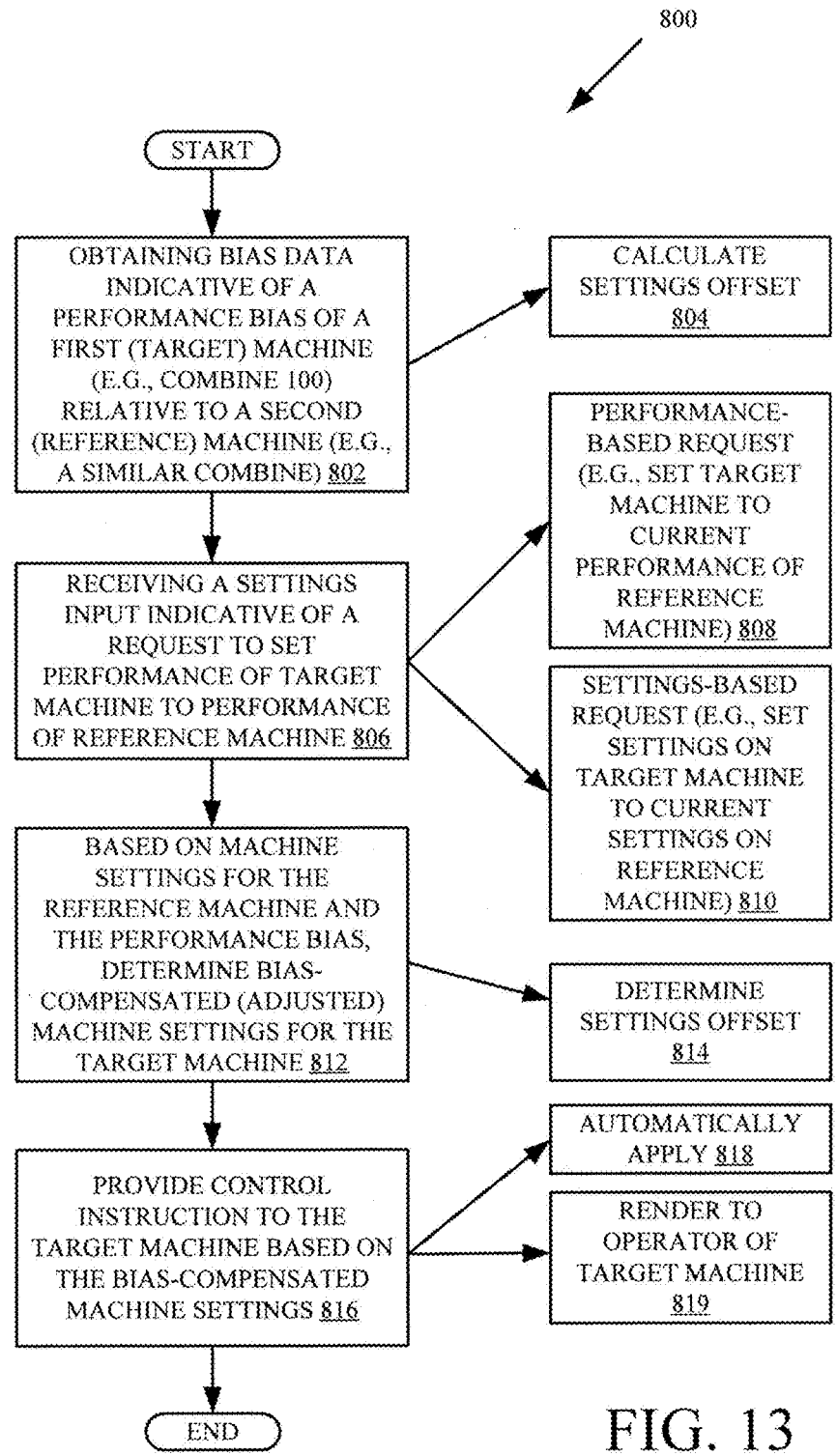
FIG. 13 is a flow diagram illustrating one example of a method for generating bias-compensated settings.

FIG. 13 is a flow diagram illustrating an example method 800 for generating bias-compensated settings (e.g., 704) based on a settings input (e.g., 702) and machine settings bias data indicative of performance bias between machines. For the sake of illustration, but not by limitation, method 800 will be described in the context of system 270 shown in FIG. 12.

At step 802, machine bias estimator system 722 estimates or otherwise obtains bias data indicative of a performance bias of a first machine (e.g., combine 100) relative to a second machine (e.g., another combine that is similar or otherwise corresponds to combine 100). The first machine is referred to as the target machine for which bias-compensated settings 704 are to be generated, and the second machine is referred to as the reference machine, that is used in determining how to bias-compensate the target machine settings. In one example, the reference machine comprises a same or similar machine (e.g., the same or similar make and model).

As shown at block 804, one example includes calculating a settings offset, indicative of an offset or difference between settings for the target machine and the reference machine that achieve similar performance. One example is discussed in further detail below with respect to FIG. 14.

At block 806, machine bias compensation system 726 receives a settings input (e.g., input 702) that is indicative of a request to set performance of the target machine to correspond to performance of the reference machine. The settings input can take a variety of different forms. One example of block 806 is discussed below with respect to FIG. 15. Briefly, however, the settings input received at block 806 can comprise a performance-based request (represented by block 808) that requests that the target machine be set to same (e.g., current) performance of the reference machine. For example, the request can indicate that the target machine is to have the same overall performance score, or the same pillar score(s) as the reference machine. Settings input 702 will therefore indicate this, by identifying the target and reference machines through identifiers 706 and 708.

In another example, represented by block 810, the settings input can comprise a settings-based request. For example, with respect to Table 1 above, the settings input at block 810 can indicate that the target machine is to have the same settings as the reference machine. For instance, using the above-mentioned user interfaces, a user may push the same or similar set of settings to combine 100 and one or more other combines in the same fleet. In this case, system 270 can infer that the user desires the same or similar performance for the target and reference machines, due to the request to have the same settings for both machines.

At block 812, system 726 determines bias-compensated (adjusted) machine settings 704 for the target machine. One example of block 812 is discussed below with respect to FIG. 16. Briefly, however, the bias-compensated machine settings 704 is based on the above-mentioned performance bias and machine settings associated with the target performance for the reference machine. In one example, this includes identifying a settings offset (at block 814) to the machine settings for the reference machine, to obtain the bias-compensated machine settings for the target machine.

With respect to the example shown above in Table 1, Table 2 illustrates a set of bias-compensated machine settings for combine M1 to obtain a same or similar performance as combine M2.

TABLE 2

| THRESHING CLEARANCE | 19 |
| THRESHING SPEED | 970 n/min |
| CLEANING FAN SPEED | 1180 n/min |
| CHAFFER OPENING | 16 |
| SIEVE OPENING | 6 |

Thus, the settings offset indicates that, to obtain similar performance as combine M2 (i.e., a performance score of 78, a performance score in the range of 76-80, etc.), the threshold clearance setting of combine M1 is increased by 8, the threshold speed of combine M1 is increased by 190 n/min, the cleaning fan speed of combine M1 is increased by 50 n/min, the chaffer clearance setting of combine M1 is increased by 3, and the sieve clearance setting of combine M1 remains the same.

At block 816, system 270 provides an indication of the bias-compensated machine settings to the target machine. In one example, this can comprise automatically applying the bias-compensated machine settings to the target machine. This is represented by block 818. In another example, the bias-compensated machine settings can be rendered to the operator of the target machine, for manual, automated, and/or semi-automated application to the respective controllable subsystems of the target machine. This is represented by block 819.

Figure 14A:
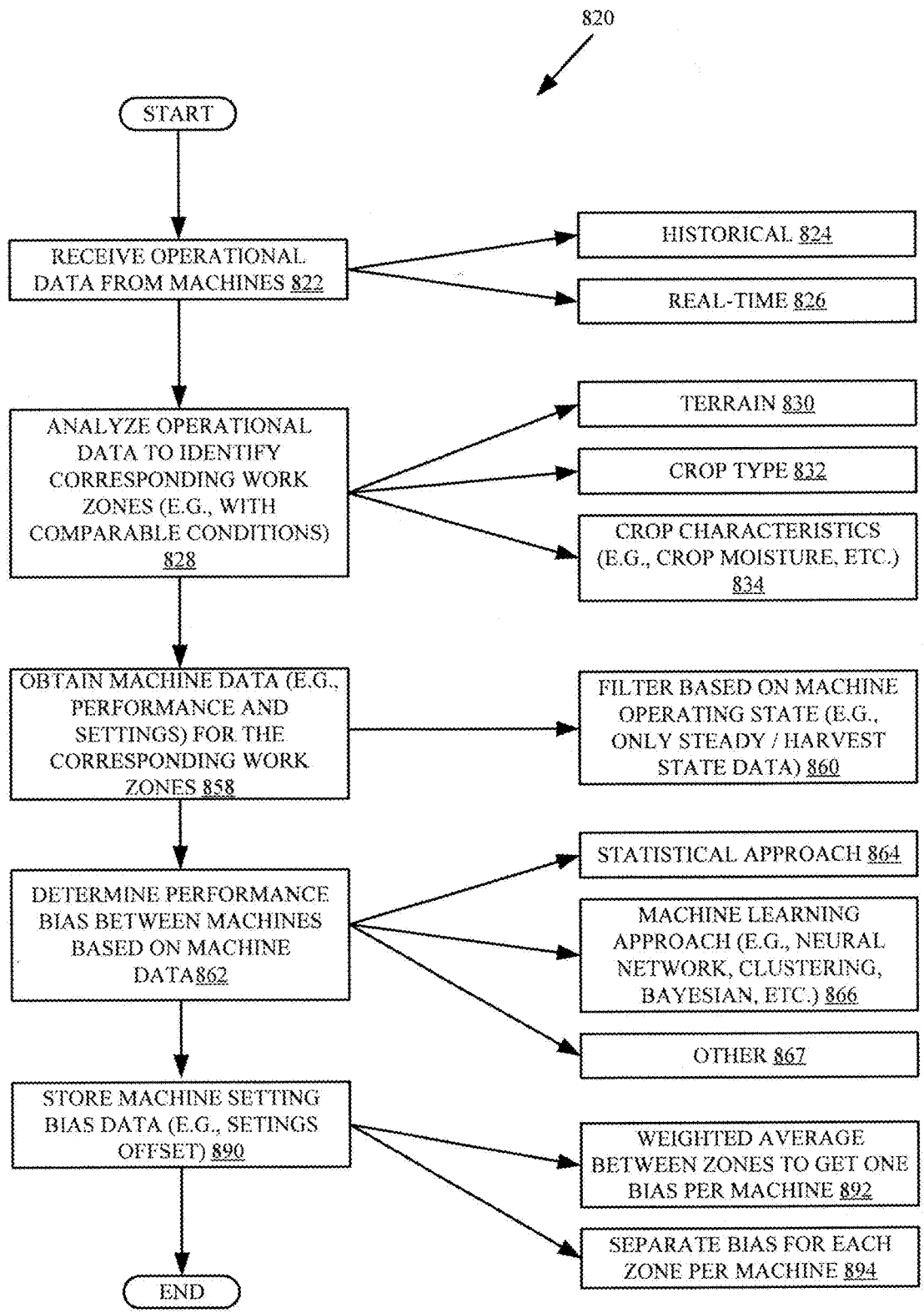
FIGS. 14A-14C (collectively referred to as FIG. 14) illustrate one example of a method for obtaining bias data indicative of a performance bias.
Figure 14B:
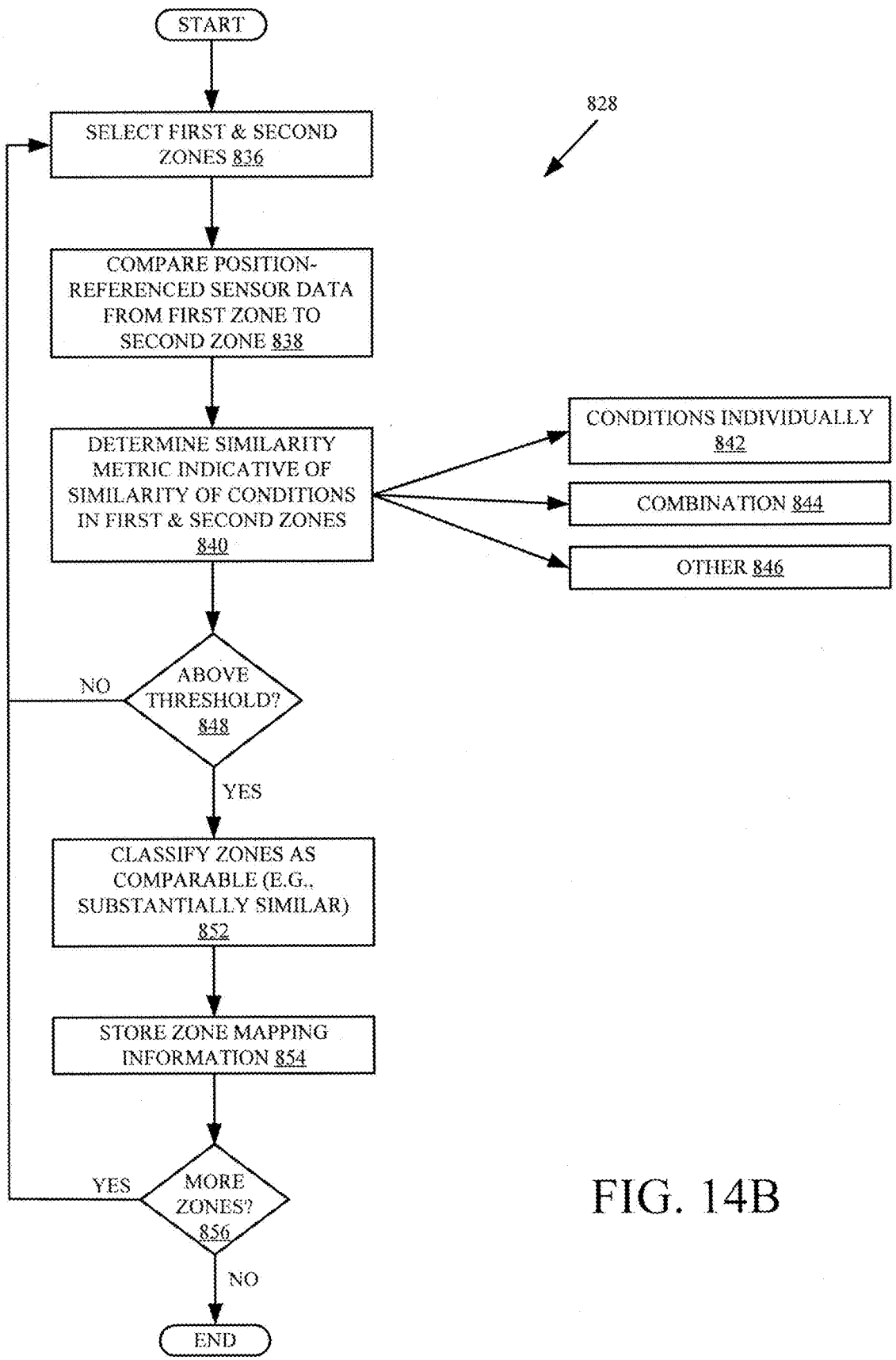
Figure 14C:
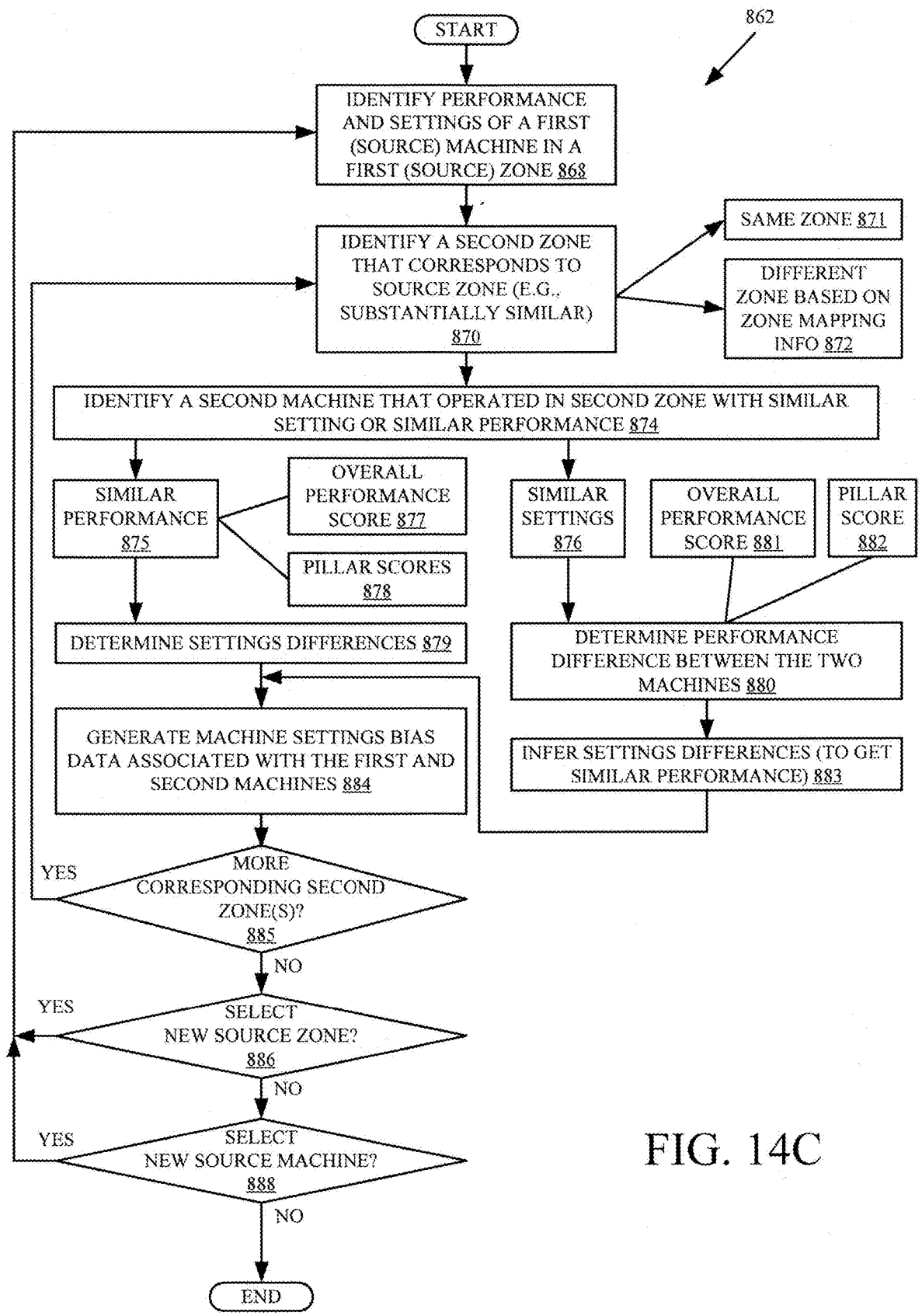

FIGS. 14A-14C (collectively referred to as FIG. 14) illustrate one example of block 802 illustrated above with respect to FIG. 13. As shown in FIG. 14A, operational data is obtained from, or otherwise corresponds to, a number of machines associated with architecture 200. These machines can include combine 100 and any number of other combines (in the same fleet as combine 100 and/or in different fleet(s)). This data can be historical data that is stored in a data store (e.g., data store 714), which is represented by block 824. Alternatively, or in addition, the operational data can comprise real-time data that is obtained from the machines. This is represented by block 826.

In any case, the operational data obtained at block 822 comprises position-referenced sensor data indicative of performance of the machines at particular locations, as well as corresponding settings data for those machines indicating settings of the machines when the performance was achieved at those locations.

At block 828, the operational data is analyzed to identify corresponding work zones. In one example, two or more work zones are considered as corresponding work zones if they have comparable conditions, such as conditions that are within a similarity threshold.

The geographic boundaries (for use in identifying the operational data to be used in the analysis at block 828) can be determined in any of a number of ways. For example, it can be determined manual, automatically, and/or semi-automatically based on field maps, location information from the machines, or data from external sources (e.g., FMIS zone maps, etc.).

The conditions at block 828 can include terrain conditions indicative of various conditions, aspects, or features of the terrain. Examples include terrain slope, soil conditions, soil type, to name a few. This is represented by block 830.

The conditions can also include a crop type identifier that indicates a type of crop being harvested (or otherwise processed) in the zone(s). This is represented by block 832. The conditions can also include crop characteristics, such as crop moisture, etc. This is represented at block 834.

For sake of further illustration, FIG. 14B illustrates a more detailed example of block 828. At block 836, a plurality of zones are selected for comparison to determine whether they have comparable conditions, such that they are considered as comparable or similar zones. In the illustrated example, a first zone and a second zone are selected.

At block 838, position-referenced sensor data from the first and second zone is compared. This position-referenced sensor data is obtained, in one example, from any number of machines that previously operated in the field (e.g., from the data received at block 822).

At block 840, the method determines a similarity metric between the first and second zones that is indicative of a similarity (or dissimilarity) of the conditions in the first and second zones. For example, the conditions in those zones can be compared individually, as indicated by block 842. In this case, the similarity metric can be indicative of how many conditions are similar, and/or a degree of similarity of each of those conditions. In one example, conditions are considered to be similar based on numerical values assigned to each condition. In the case of terrain conditions, for example, terrain slope can be determined in terms of a degree of inclination. Likewise, terrain soil type can be determined as a percentage of various organic materials and/or moisture percentage. In another example, crop moisture can be determined as a function of a percentage. In the illustrated example, the conditions are considered substantially similar if they are within a similarity threshold, such as 10%, 5%, 2%, etc. These, of course, are by way of example only.

Alternatively, or in addition, the similarity metric can be determined based on a combination of condition similarities. This is represented by block 844. For example, the similarity metric can be based on a weighted combination of the similarities of the individual conditions. The similarity metric can be determined in other ways as well. This is represented by block 846.

At block 848, the method determines whether the similarity metric determined at block 840 is above a similarity threshold. As mentioned above, the similarity threshold can be numerical based, such as a particular percentage. This of course is by way of example only.

If the similarity metric is above the similarity threshold, the method proceeds to block 852 where the first and second zones are classified as being comparable. In the illustrated example, this indicates that the two zones are the same or substantially similar (i.e., they have comparable conditions). Zone mapping information is stored at block 854, indicative of the classification at block 852.

At block 856, the method determines whether there are any more zones to be analyzed for zone classification. If so, the method returns to block 836 in which a different set of zones can be selected and blocks 838-856 repeated for those zones.

Referring again to FIG. 14A, the method proceeds to block 858 where machine data is obtained, from the operational data received at block 822. This machine data is indicative of the performance and settings of each of the machines, when the operational data was generated. In one example, the machine data is position-referenced so that the machine performance and machine settings are correlated to the corresponding location that the respective machine was at (i.e., which work zone it was in) when those machine settings were used to achieve the machine performance.

In one example, at block 860, the machine data can be filtered based on machine operating state. For instance, the machine data can be filtered such that only data that was obtained when the machine was in a steady state and/or harvest state is utilized. By way of example, in the case of a combine harvester, the machine is in a harvest state when it is actively harvesting agricultural material from the zone. That is, the machine is in a non-harvest state when it is not harvesting agricultural material, such as when the operator is making a turn at the end of a row in the zone or has just begun (or is just ending) a pass through a row in the zone. Similarly, the machine is in a steady state when setting changes are not actively being made, or have not been made for a threshold amount of time. In other words, if an operator makes a setting change, the machine is considered to be in a non-steady state for a period of time (e.g., 5 seconds, 10 seconds, 20 seconds, etc.) following the setting change.

In any case, filtering the data at block 860 can remove transitory noise in the data, while reducing data complexity and size.

At block 862, performance bias is determined between various sets of machines. This can be done through any of a variety of approaches such as, but not limited to, a statistical approach (represented by block 864), a machine learning approach (represented by block 866), and/or other approach (represented by block 867). For example, the data can be evaluated using clustering and cluster analysis, neural networks, supervised or unsupervised learning techniques, support vector machines, among others.

FIG. 14C illustrates one example of determining performance bias at block 862 using the machine data obtained at block 858. As shown in FIG. 14C, performance and settings of a first machine in a first zone is identified at block 868. The first machine is referred to as the source machine and the first zone is referred to as the source zone.

At block 870, a second zone is identified that corresponds to the first, source zone. In the illustrated example, the second zone is considered to have a threshold correspondence to the source zone if it is substantially similar, as determined by the classification and zone mapping information at blocks 852 and 854 of FIG. 14B.

In one example, block 871 identifies a data set for a different machine from the same zone (i.e., two different machines have operational data from the same parcel of land). In another example, the second zone is a different piece of land from the first zone, and is identified based on the zone mapping information stored at block 854.

At block 874, based on the machine data obtained at block 858, the method identifies a second machine that operated in the second zone with similar settings and/or similar performance as the first machine in the first zone. If similar performance is identified, the method proceeds to block 875. If similar settings are identified, the method proceeds to block 876.

In one example of block 875, identification of similar performance can be based on the second machine having a performance score that is within a similarity threshold of the performance score of the first machine. This can be based on an overall performance score of the second machine (operating in the second zone) being the same or similar (e.g., within a threshold percentage) as the first machine (operating in the first zone). This is represented by block 877.

Alternatively, or in addition, identification of similar performance can be based on similarity of one or more individual pillar scores 878. Examples of pillar scores are discussed above. Briefly, however, pillar scores can be scores computed based on various sensor inputs and correspond to particular performance categories, such as productivity, fuel consumption, power utilization, crop material quality, etc.

At block 879, the method determines differences between the settings used by the source machine in the source zone and the settings used by the second machine in the second zone. This can use "forward" and "backward" pairings for analysis purposes. For example, it can identify machines that experienced different performance with the same (or similar) settings and/or machines that experienced the same (or similar) performance with different settings.

Identification of similar settings at block 876 can be based on the second machine having a threshold level of similar settings as the first machine. The method proceeds to block 880 where the method determines a performance difference between the two machines that operated with similar settings in the similar zones. This performance difference can be based on a comparison of the overall performance scores of the machines at block 881 and/or on individual pillar scores at block 882.

At block 883, the method infers settings differences in the two machines to get similar performance. This can be done in any of a variety of ways. By way of example, but not by limitation, if the two machines were determined to have different fuel consumption pillar scores, block 883 infers that setting a particular motor speed of the source machine (e.g., lowering it by a factor of 2) would achieve a similar fuel consumption pillar score as the second machine.

At block 884, the method generates a representation of the settings differences between the first and second machines (either determined at block 879 or block 883) as machine settings bias data 712. For instance, the representation of the settings differences comprises a settings offset between the first and second machines.

The method proceeds to block 885 where it determines whether there are more corresponding second zone(s) to be analyzed relative to the source zone. If so, the method returns to block 870 to identify any additional second machines to analyze relative to the source machine, to identify additional bias data. If not, the method proceeds to block 886 where the method selects a new source zone to be used.

Similarly, at block 888, the method determines whether there is a new source machine to compare performance/setting data against other similar machines operating in similar zones.

Referring again to FIG. 14A, the method proceeds to block 890 where the machine setting bias data is stored in data store 714. In one example, this settings bias data comprises settings offset information. By way of example, the machine setting bias data maps pairs of machines to one another, and identifies the settings differences between those machines to obtain bias-compensated settings 704.

For sake of illustration, but not by limitation, the machine setting bias data comprises a settings offset table having a number of entries or rows. Each entry maps a first, target machine (e.g., combine 100) to another machine. The entry also identifies changes to be made to the target combine to compensate for bias between the target combine and the other combine.

In one example, this machine setting bias data can comprise a weighted average (or other combination) between all of the zones that are analyzed for those two machines. In this way, the method can obtain one set of bias data to be used for the target/reference machines for any of a number of zones. In other words, the bias-compensated setting 704 that are output for the target machine are not zone-specific. Rather, the bias data can be sent to the target machine and used across a number of zones that the target machine operates in.

In another example, separate bias data can be obtained and stored for individual zones, for that machine. In this way, the bias-compensated setting 704 that are output for the target machine can be specific for the zone identified by the zone identifier 710.

Figure 15:
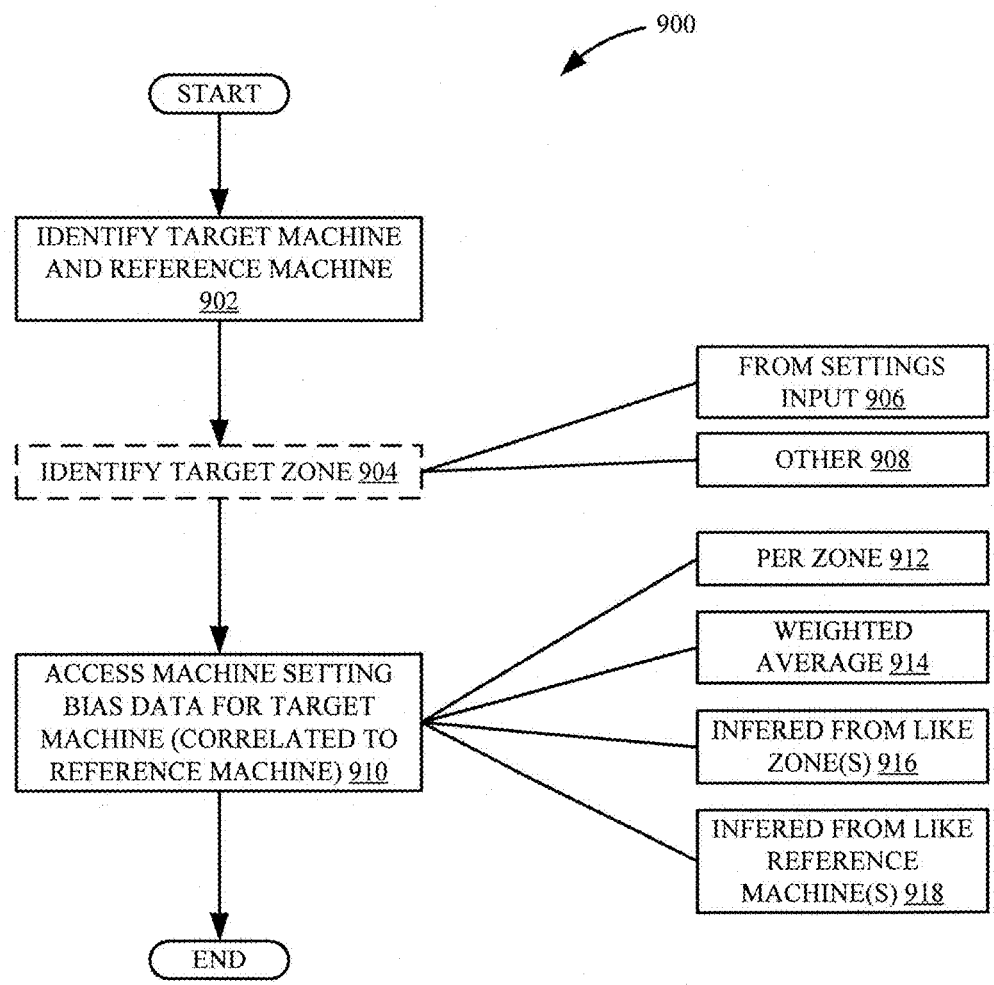
FIG. 15 is a flow diagram illustrating one example of a method for identifying machine setting bias data for a target machine.

FIG. 15 illustrates one example of a method 900 performed at block 806 illustrated above with respect to FIG. 13.

At block 902, a target machine and reference machine are identified, for example based on the target machine identifier 706 and reference machine identifier 708 in the settings input 702. By way of example, as noted above, user 220 may provide settings input 702 using user computing system 204, and settings input 702 may indicate that combine 100 is the target machine and is to have a similar performance as a second, reference combine identified by identifier 708.

In one example, user 220 sends settings input 702 through user computing system 204 to set the settings of combine 100 to be the same as another combine. For instance, the settings may indicate a same or similar set of settings (concave clearance, rotor speed, clearing fan speed, sieve setting, chaffer settings, etc.).

Optionally, as represented by block 904, the method can identify a target zone, for example from the settings input (block 906) or otherwise (block 908). For instance, block 908 receives location information from combine 100 indicating a current location of combine 100, and infers the target zone for operation of combine 100 based on the location.

Block 910 accesses machine setting bias data for the target machine, that is correlated to the reference machine. For example, block 910 accesses machine setting bias data 710 to identify the settings offset for combine 100 relative to the reference combine.

In one example, this settings offset is per zone, or zone specific (represented by block 912). In other words, the settings offset can be specific to the target zone identified at block 904. In another example, the settings offset can comprise a weighted average of all (or some) of the bias data obtained for combine 100 relative to the reference combine.

In another example, the settings offset can be inferred from like zones, if zone-specific settings offset cannot be obtained. For example, based on the target zone identified at block 904, block 916 can identify another zone that is similar in characteristics to the target zone, and has settings offset data computed for combine 100 relative to the reference combine.

In another example, the settings offset can be inferred from like reference machines, as represented by block 918. For example, if machine setting bias data 712 does not include settings offset data for combine 100 relative to the reference machine, block 918 can identify another machine that is similar to the reference machine, and for which machine setting bias data 712 exists in data store 914.

Figure 16:
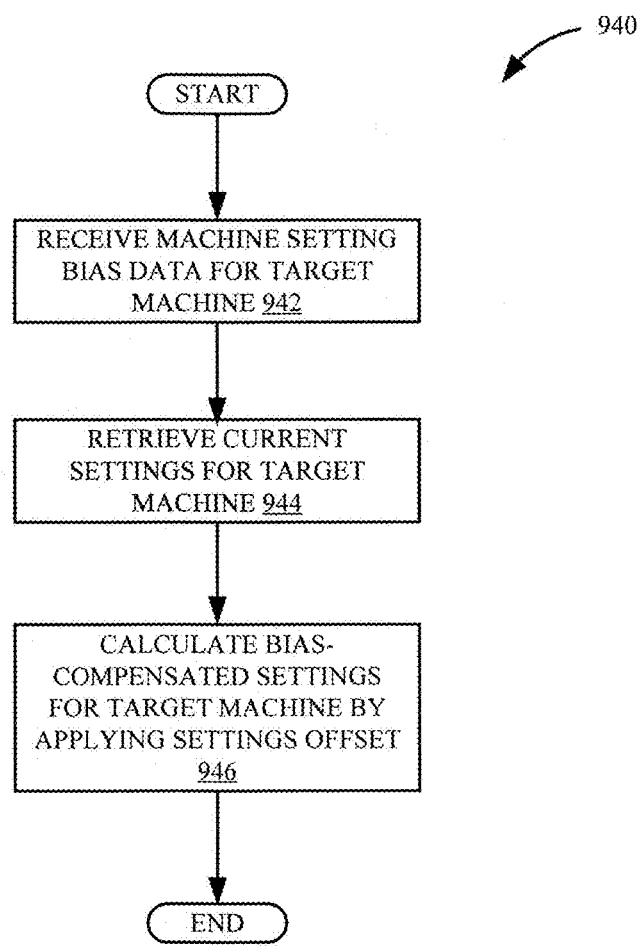
FIG. 16 is a flow diagram illustrating one example of a method for determining bias-compensated machine settings for a target machine.

FIG. 16 illustrates one example of a method 940 performed at block 812. At block 942, the machine setting bias data (accessed at block 910 in FIG. 15) is received by system 726. The current settings for the target machine is retrieved at block 944. These current settings can be identified from settings input 702, directly from the target machine, or otherwise.

At block 946, bias-compensated settings are calculated for the target machine by applying the settings offset to the current settings for the target machine. By applying the bias-compensated settings (either automatically or through manual operator input), the target machine is adjusted to similar performance as the reference machine, even though the target and reference machines may not have the same settings, but they are operating in similar field conditions. In one example, the bias-compensated settings are applied by sending control instructions to the respective controllable subsystems of combine 100.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

It will be noted that the above discussion has described a variety of different systems, components, modules, elements, and/or types of items. It should be understood that these can be implemented in any of a variety of ways. For example, they can be implemented as logic. It will be appreciated that such systems, components, and/or logic can be comprised of hardware items (such as processors and associated memory, or other processing components, some of which are described above) that perform the functions associated with those systems, components and/or logic. In addition, the systems, components and/or logic can be comprised of software that is loaded into a memory and is subsequently executed by a processor or server, or other computing component, as described above. The systems, components and/or logic can also be comprised of different combinations of hardware, software, firmware, etc., some examples of which are described herein. These are only some examples of different structures that can be used to form the systems, components and/or logic described above. Other structures can be used as well.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 17:
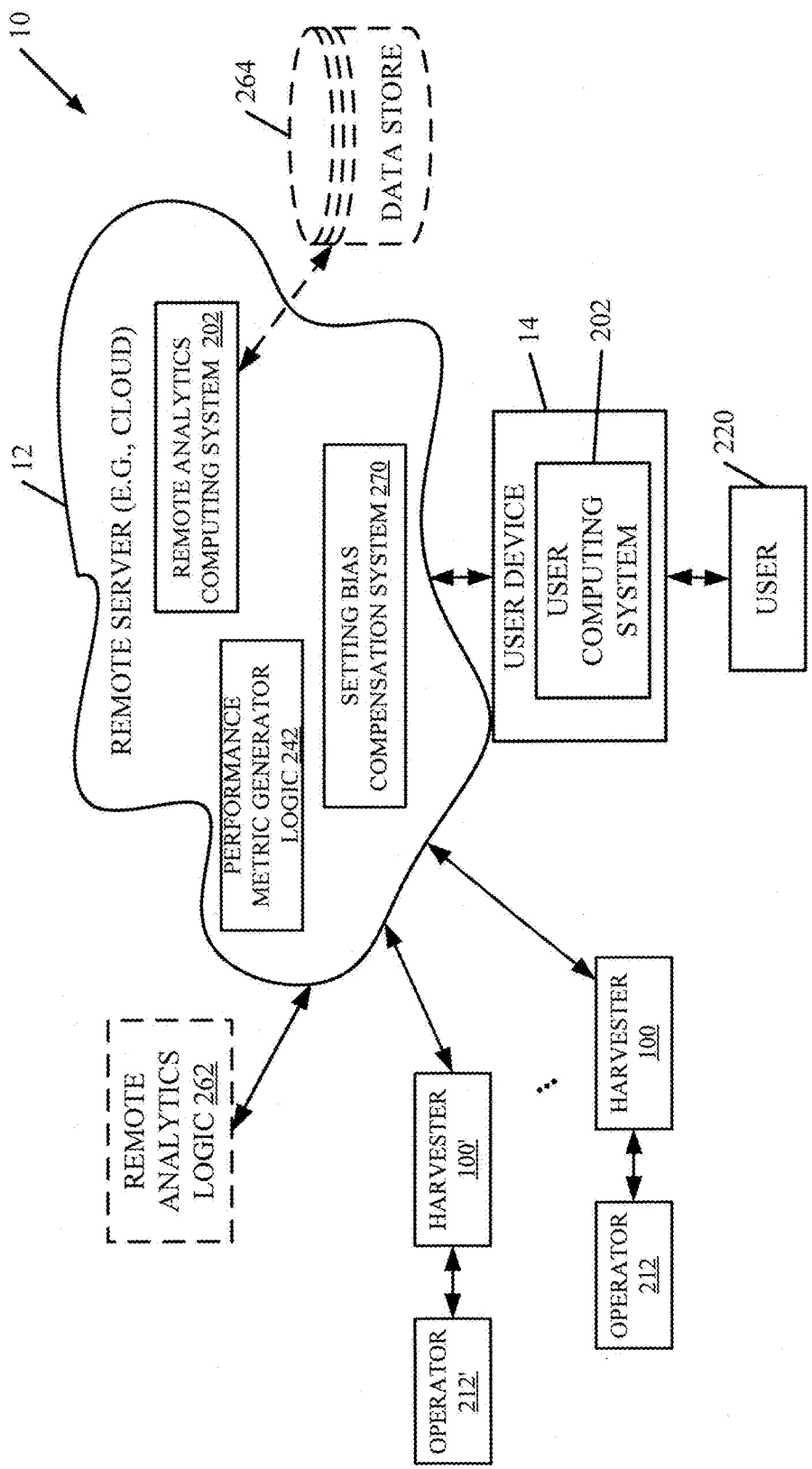
FIG. 17 is a block diagram showing one example of the architecture illustrated in FIG. 2, deployed in a remote server architecture.

FIG. 17 is a block diagram of the architecture 200, shown in FIG. 2, except that it communicates with elements in a remote server architecture 10. In an example, remote server architecture 10 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 17, some items are similar to those shown in FIG. 2 and they are similarly numbered. FIG. 17 specifically shows that a plurality of different combines 100-100' can be used, each with its own local operator 212-212'. Also, remote analytics computing system 202 can be located at a remote server location 12. Further, setting bias compensation system 270 can be located at a remote server location 12. Therefore, combines 100-100' and/or user computing system 204 (e.g., running on remote user device 14) access those systems through remote server location 12.

FIG. 17 also depicts another example of a remote server architecture. FIG. 17 shows that it is also contemplated that some elements of FIG. 2 are disposed at remote server location 12 while others are not. By way of example, performance metric generator logic 242 can be disposed in system 202. Remote analytics logic 262 and data store 264 can be disposed at a location separate from location 12, and accessed through the remote server at location 12. Alternatively, or in addition, setting bias compensation system 270 can be disposed at a location separate from location 12, and accessed through the remote server at location 12. Regardless of where they are located, they can be accessed directly by combine 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the combine comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the combine until the combine enters a covered location. The combine, itself, can then send the information to the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 18:
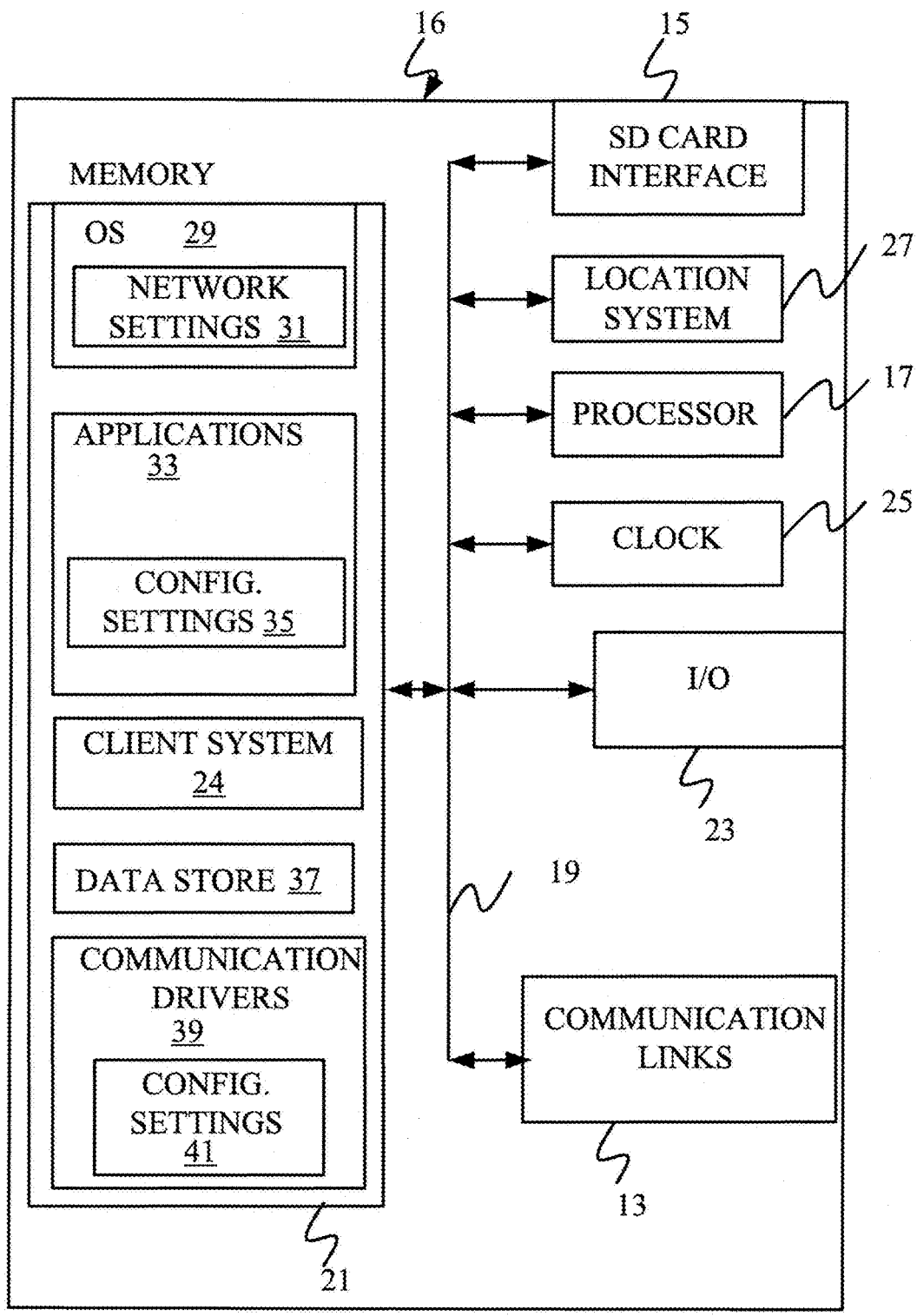
FIGS. 18-20 show examples of mobile devices that can be used in the architecture(s) shown in the previous figure(s).
Figure 19:
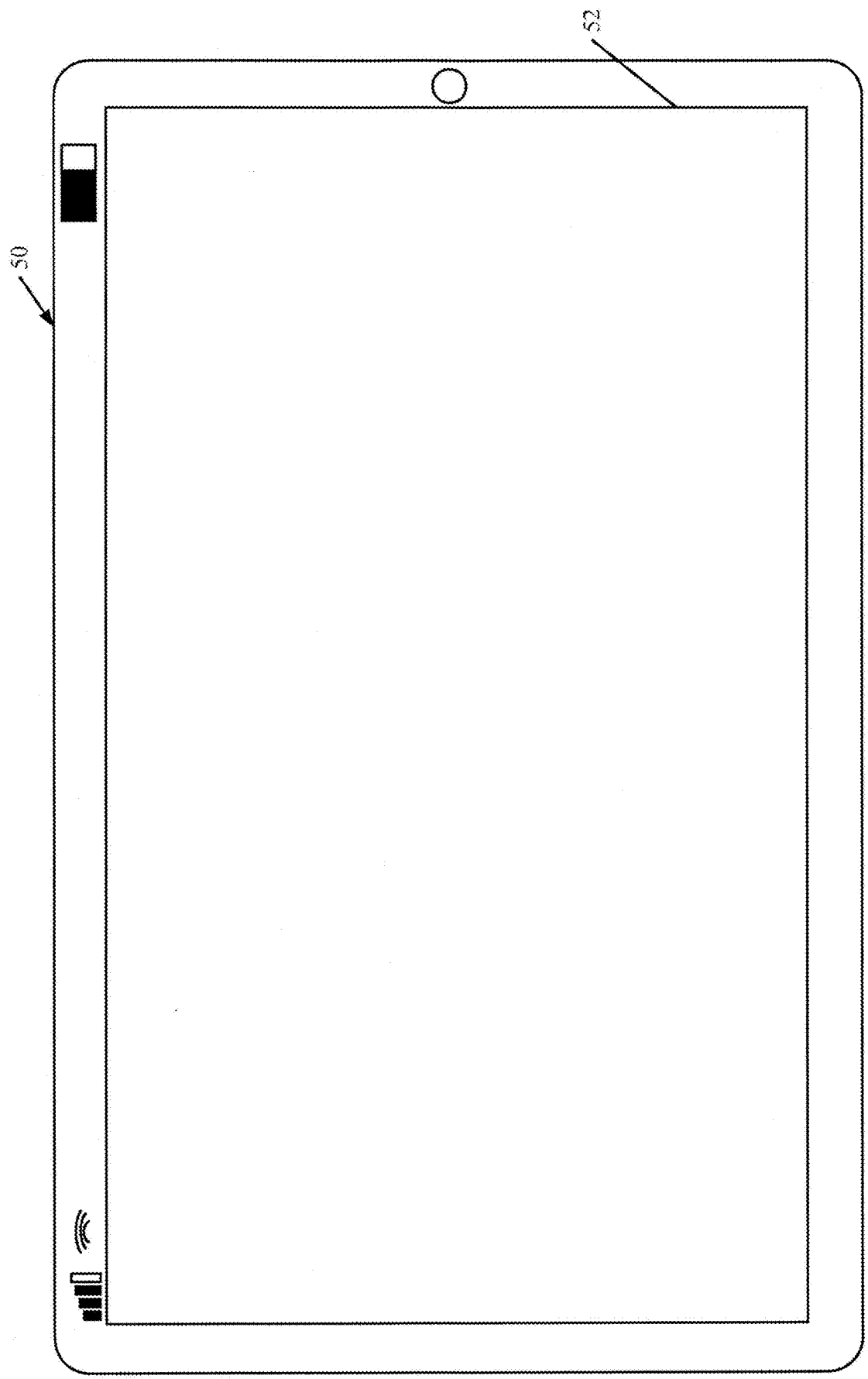
Figure 20:
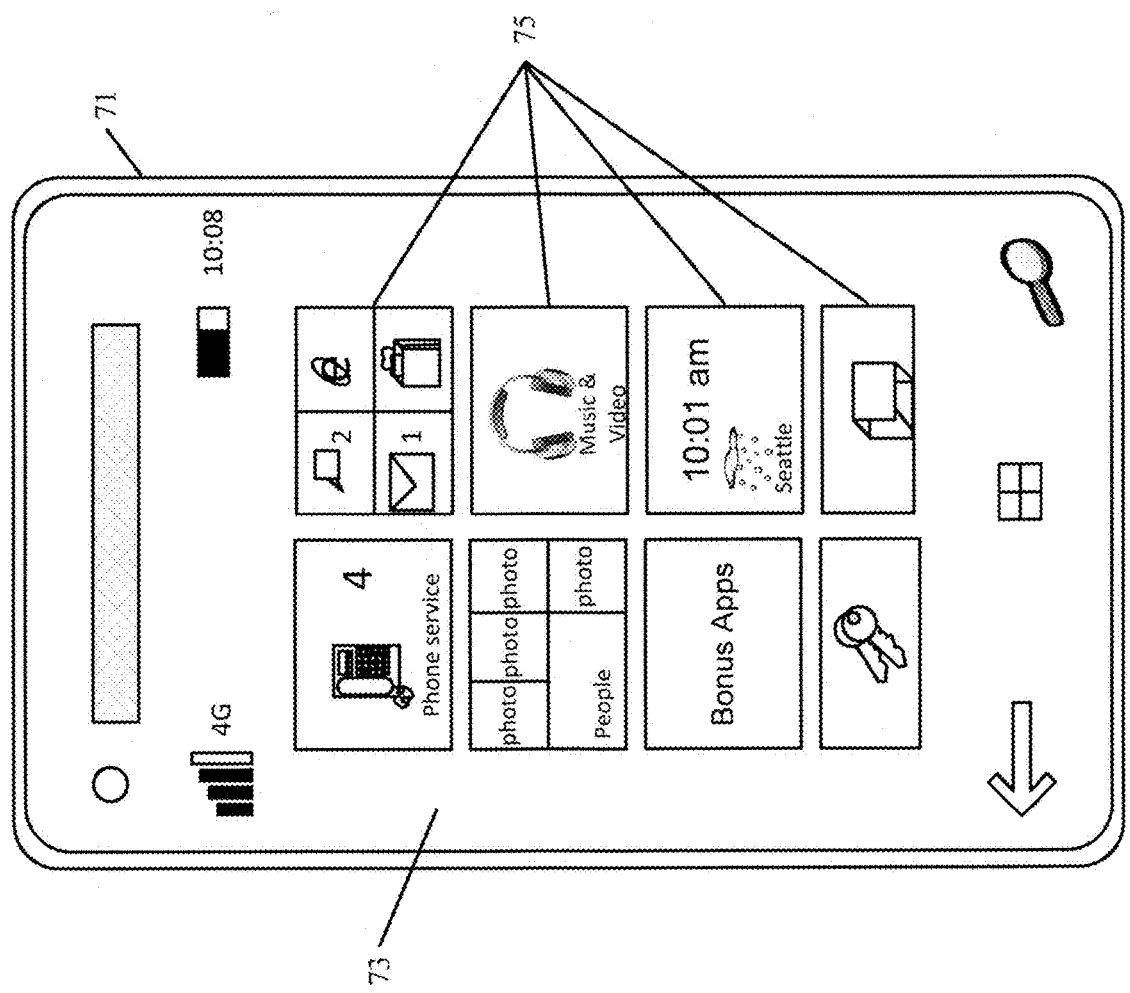

FIG. 18 is a simplified block diagram of one illustrative example of a handheld or mobile computing device that can be used as a user's or client's hand held device 16, in which the present system (or parts of it) can be deployed. For instance, a mobile device can be deployed as user computing system 204 in the operator compartment of combine 100 for use in generating, processing, or displaying the information discussed herein and in generating the control interface. FIGS. 19-20 are examples of handheld or mobile devices.

FIG. 18 provides a general block diagram of the components of a client device 16 that can run some components shown in FIG. 2, that interacts with them, or both. In the device 16, a communications link 13 is provided that allows the handheld device to communicate with other computing devices and in some examples provide a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 19 shows one example in which device 16 is a tablet computer 50. In FIG. 19, computer 50 is shown with user interface display screen 52. Screen 52 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 50 can also illustratively receive voice inputs as well.

FIG. 20 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 21:
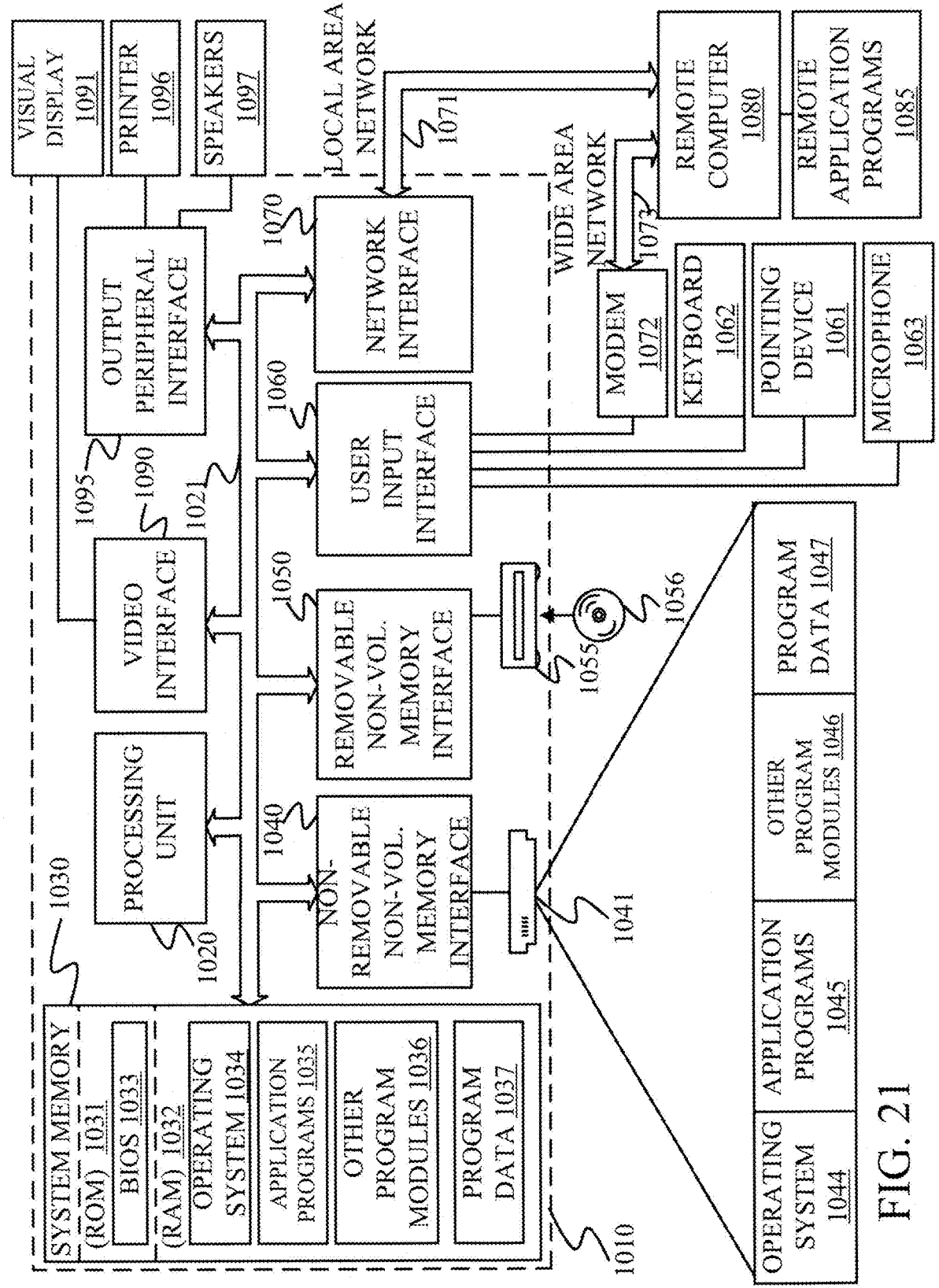
FIG. 21 is a block diagram showing one example of a computing environment that can be used in the architecture(s) shown in the previous figure(s).

FIG. 21 is one example of a computing environment in which elements of FIG. 2, or parts of it, (for example) can be deployed. With reference to FIG. 21, an example system for implementing some embodiments includes a general-purpose computing device in the form of a computer 1010. Components of computer 1010 may include, but are not limited to, a processing unit 1020 (which can comprise processors or servers from previous FIGS.), a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. Memory and programs described with respect to FIG. 2 can be deployed in corresponding portions of FIG. 21.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1010. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 21 illustrates operating system 1034, application programs 1035, other program modules 1036, and program data 1037.

The computer 1010 may also include other removable/non-removable volatile/nonvolatile computer storage media. By way of example only, FIG. 21 illustrates a hard disk drive 1041 that reads from or writes to non-removable, nonvolatile magnetic media, an optical disk drive 1055, and non-volatile optical disk 1056. The hard disk drive 1041 is typically connected to the system bus 1021 through a non-removable memory interface such as interface 1040, and optical disk drive 1055 are typically connected to the system bus 1021 by a removable memory interface, such as interface 1050.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 21, provide storage of computer readable instructions, data structures, program modules and other data for the computer 1010. In FIG. 21, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037.

A user may enter commands and information into the computer 1010 through input devices such as a keyboard 1062, a microphone 1063, and a pointing device 1061, such as a mouse, trackball or touch pad. Other input devices (not shown) may include a joystick, game pad, satellite dish, scanner, or the like. These and other input devices are often connected to the processing unit 1020 through a user input interface 1060 that is coupled to the system bus, but may be connected by other interface and bus structures. A visual display 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 is operated in a networked environment using logical connections (such as a local area network—LAN, or wide area network WAN) to one or more remote computers, such as a remote computer 1080.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. In a networked environment, program modules may be stored in a remote memory storage device. FIG. 21 illustrates, for example, that remote application programs 1085 can reside on remote computer 1080.

It should also be noted that the different examples described herein can be combined in different ways. That is, parts of one or more examples can be combined with parts of one or more other examples. All of this is contemplated herein.

Example 1 is a method performed by a harvesting machine control system comprising obtaining bias data indicative of a performance bias of a first harvesting machine relative to at least one other harvesting machine, receiving a settings input indicative of a request to set performance of the first harvesting machine to correspond to performance of the at least one other harvesting machine, based on the bias data and machine settings associated with the performance of the at least one other harvesting machine, determining adjusted machine settings for the first harvesting machine, and outputting a control instruction to the first harvesting machine based on the adjusted machine settings.

Example 2 is the method of any or all previous examples, wherein the at least one other harvesting machine comprises a second harvesting machine and the adjusted machine settings are associated with controllable subsystems on the first harvesting machine.

Example 3 is the method of any or all previous examples, wherein the at least one other harvesting machine comprises a fleet of harvesting machines.

Example 4 is the method of any or all previous examples, wherein the settings input defines a target performance score for the first harvesting machine that corresponds to a performance score associated with the second harvesting machine.

Example 5 is the method of any or all previous examples, wherein the settings input defines a first set of settings for the first harvesting machine and a second set of settings for the second harvesting machine, the second set of settings corresponding to the first set of settings.

Example 6 is the method of any or all previous examples, wherein the control instruction is configured to at least one of: instruct a user interface device associated with the first harvesting machine to render an indication of the adjusted machine settings, or instruct the first harvesting machine to automatically apply the adjusted machine settings to the controllable subsystems.

Example 7 is the method of any or all previous examples, and further comprising displaying a machine selection user input mechanism, and based on user actuation of the machine selection user input mechanism, selecting the first and second harvesting machines.

Example 8 is the method of any or all previous examples, wherein the bias data defines a settings offset between the first and second harvesting machines, and determining the adjusted machine settings comprises applying the settings offset to the machine settings.

Example 9 is the method of any or all previous examples, and further comprising calculating the settings offset based on position-referenced data associated with the first and second harvesting machines.

Example 10 is the method of any or all previous examples, wherein calculating the settings offset comprises identifying a set of corresponding zones based on the position-referenced data, identifying a first set of machine settings that is associated with a first one of the zones and corresponds to the first harvesting machine, identifying a second set of machine settings that is associated with a second one of the zones and corresponds to the second harvesting machine, and calculating the settings offset based on differences between the first and second sets of machine settings.

Example 11 is the method of any or all previous examples, and further comprising identifying a particular zone associated with operation of the first harvesting machine, and determining the adjusted machine settings based on the particular zone Example 12 is a computing system comprising at least one processor and memory storing instructions executable by the at least one processor, wherein the instructions, when executed, configure the computing system to:
obtain bias data indicative of a performance bias of a first harvesting machine relative to at least one other harvesting machine;
receive a settings input indicative of a request to set performance of the first harvesting machine to correspond to performance of the at least one other harvesting machine;
based on the bias data and machine settings associated with the performance of the at least one other harvesting machine, determine adjusted machine settings for the first harvesting machine; and
output a control instruction to the first harvesting machine based on the adjusted machine settings.

Example 13 is the computing system of any or all previous examples, wherein the at least one other harvesting machine comprises a second harvesting machine.

Example 14 is the computing system of any or all previous examples, wherein the at least one other harvesting machine comprises a second harvesting machine, and the settings input defines at least one of:
a first set of settings for the first harvesting machine and a second set of settings for the second harvesting machine, the second set of settings corresponding to the first set of settings; or
a target performance score for the first harvesting machine that corresponds to a performance score associated with the second harvesting machine.

Example 15 is the computing system of any or all previous examples, wherein the control instruction is configured to at least one of:
instruct a user interface device associated with the first harvesting machine to render an indication of the adjusted machine settings; or
instruct the first harvesting machine to automatically apply the adjusted machine settings to the controllable subsystems.

Example 16 is the computing system of any or all previous examples, wherein the bias data defines a settings offset between the first and second harvesting machines, and the instructions configure the computing system to apply the settings offset to the machine settings.

Example 17 is the computing system of any or all previous examples, wherein the instructions configure the computing system to:
identify a set of corresponding zones based on position-referenced data;
identify a first set of machine settings that is associated with a first one of the zones and corresponds to the first harvesting machine;
identify a second set of machine settings that is associated with a second one of the zones and corresponds to the second harvesting machine; and
calculate the settings offset based on differences between the first and second sets of machine settings.

Example 18 is a mobile machine control system comprising:
a machine setting offset calculation component configured to:
  identify a set of corresponding zones based on the machine data;
  identify a first set of machine settings that is associated with a first one of the zones and corresponds to the first mobile machine;
  identify a second set of machine settings that is associated with a second one of the zones and corresponds to at least one other mobile machine; and
  calculate a settings offset based on differences between the first and second sets of machine settings; and
a machine bias compensation system configured to:
  receive a settings input indicative of a request to set performance of the first mobile machine to correspond to performance of the at least one other mobile machine;
  identify machine settings associated with the performance of the at least one other mobile machine;
  determine adjusted machine settings for the first mobile machine by applying the settings offset to the machine settings; and
  output a control instruction to the first mobile machine based on the adjusted machine settings.

Example 19 is the mobile machine control system of any or all previous examples, wherein the first mobile machine comprises a first agricultural harvesting machine, the at least one other mobile machine comprises a second agricultural harvesting machine, and the machine data comprises position-referenced data associated with the first and second agricultural harvesting machines.

Example 20 is the mobile machine control system of any or all previous examples, wherein the settings input defines at least one of:

a first set of settings for the first mobile machine and a second set of settings for the at least one other mobile machine, the second set of settings corresponding to the first set of settings; or a target performance score for the first mobile machine that corresponds to a performance score associated with the at least one other mobile machine.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by a harvesting machine control system, the method comprising:
    identifying a set of corresponding zones based on position-referenced data;
    identifying a first set of machine settings that is associated with a first one of the zones and corresponds to a first harvesting machine;
    identifying a second set of machine settings that is associated with a second one of the zones and corresponds to a second harvesting machine;
    calculating a settings offset based on differences between the first and second sets of machine settings, wherein the settings offset is indicative of a performance bias of the first harvesting machine relative to the second harvesting machine;
    receiving a settings input indicative of a request to set performance of the first harvesting machine to correspond to performance of the second harvesting machine;
    determining, based on the settings offset, an adjusted machine setting associated with a controllable subsystem on the first harvesting machine; and
    outputting a control instruction to the first harvesting machine based on the adjusted machine setting.

2. The method of claim 1, wherein the first and second harvesting machines comprise a fleet of harvesting machines.

3. The method of claim 1, wherein the settings input defines a target performance score for the first harvesting machine that corresponds to a performance score associated with the second harvesting machine.

4. The method of claim 1, wherein the settings input defines a first set of settings for the first harvesting machine and a second set of settings for the second harvesting machine, the second set of settings corresponding to the first set of settings.

5. The method of claim 1, wherein the control instruction is configured to at least one of:
    instruct a user interface device associated with the first harvesting machine to render an indication of the adjusted machine setting; or
    instruct the first harvesting machine to automatically apply the adjusted machine setting to the controllable subsystem.

6. The method of claim 1, and further comprising:
    displaying a machine selection user input mechanism; and
    based on user actuation of the machine selection user input mechanism, selecting the first and second harvesting machines.

7. The method of claim 1, and further comprising:
    identifying a particular zone associated with operation of the first harvesting machine; and
    determining the adjusted machine setting based on the particular zone.

8. A computing system comprising:
    at least one processor; and
    memory storing instructions executable by the at least one processor, wherein the instructions, when executed, configure the computing system to:
        identify a set of corresponding zones based on position-referenced data;
        identify a first set of machine settings that is associated with a first one of the zones and corresponds to a first harvesting machine;
        identify a second set of machine settings that is associated with a second one of the zones and corresponds to a second harvesting machine;
        calculate a settings offset based on differences between the first and second sets of machine settings, the settings offset being indicative of a performance bias of the first harvesting machine relative to the second harvesting machine;
        receive a settings input indicative of a request to set performance of the first harvesting machine to correspond to performance of the second harvesting machine;
        determine, based on the settings offset, an adjusted machine setting for the first harvesting machine; and
        output a control instruction to the first harvesting machine based on the adjusted machine setting.

9. The computing system of claim 8, wherein the adjusted machine setting is associated with a controllable subsystem on the first harvesting machine.

10. The computing system of claim 9, wherein the settings input defines at least one of:
    a first set of settings for the first harvesting machine and a second set of settings for the second harvesting machine, the second set of settings corresponding to the first set of settings; or
    a target performance score for the first harvesting machine that corresponds to a performance score associated with the second harvesting machine.

11. The computing system of claim 9, wherein the control instruction is configured to at least one of:
    instruct a user interface device associated with the first harvesting machine to render an indication of the adjusted machine settings; or
    instruct the first harvesting machine to automatically apply the adjusted machine setting to the controllable subsystem.

12. A mobile machine control system comprising:
    a machine setting offset calculation component configured to:
        identify a set of corresponding zones based on the machine data;
        identify a first set of machine settings that is associated with a first one of the zones and corresponds to a first mobile machine;
        identify a second set of machine settings that is associated with a second one of the zones and corresponds to at least one other mobile machine; and
        calculate a settings offset based on differences between the first and second sets of machine settings; and a machine bias compensation system configured to:
receive a settings input indicative of a request to set performance of the first mobile machine to correspond to performance of the at least one other mobile machine;
identify machine settings associated with the performance of the at least one other mobile machine;
determine adjusted machine settings for the first mobile machine by applying the settings offset to the machine settings; and
output a control instruction to the first mobile machine based on the adjusted machine settings.

13. The mobile machine control system of claim 12 wherein the first mobile machine comprises a first agricultural harvesting machine, the at least one other mobile machine comprises a second agricultural harvesting machine, and the machine data comprises position-referenced data associated with the first and second agricultural harvesting machines.

14. The mobile machine control system of claim 12, wherein the settings input defines at least one of:
a first set of settings for the first mobile machine and a second set of settings for the at least one other mobile machine, the second set of settings corresponding to the first set of settings; or
a target performance score for the first mobile machine that corresponds to a performance score associated with the at least one other mobile machine.

* * * * *